United States Patent
Manickam et al.

(10) Patent No.: US 7,664,172 B1
(45) Date of Patent: *Feb. 16, 2010

(54) RECEIVER SYSTEM HAVING ANALOG PRE-FILTER AND DIGITAL EQUALIZER

(75) Inventors: Tulsi Manickam, Rancho Pensaquitos, CA (US); Peter J. Sallaway, San Diego, CA (US); Sreen A. Raghavan, La Jolla, CA (US); Abhijit M. Phanse, Cupertino, CA (US); James B. Wieser, Pleasanton, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/505,137

(22) Filed: Aug. 15, 2006

Related U.S. Application Data

(63) Continuation of application No. 09/561,086, filed on Apr. 28, 2000, now Pat. No. 7,254,198.

(51) Int. Cl.
*H03H 7/30* (2006.01)
*H04B 1/10* (2006.01)
*H04L 1/00* (2006.01)

(52) U.S. Cl. .................. 375/232; 375/348; 375/350

(58) Field of Classification Search ............. 375/230, 375/232, 233, 346, 348, 350
See application file for complete search history.

(56) References Cited

U.S. PATENT DOCUMENTS

| | | | |
|---|---|---|---|
| 5,031,194 A | 7/1991 | Crespo et al. | 375/14 |
| 5,459,679 A | 10/1995 | Ziperovich | 708/3 |
| 5,481,564 A * | 1/1996 | Kakuishi et al. | 375/230 |
| 5,517,527 A * | 5/1996 | Yu | 375/233 |
| 5,561,687 A | 10/1996 | Turner | 375/233 |
| 5,909,384 A | 6/1999 | Tal et al. | 364/724.19 |

(Continued)

OTHER PUBLICATIONS

Hinton, "Introduction to Digital Filters", http://www.staff.ncl.ac.uk/oliver.hinton/eee305/, Chap. 3, no date, pp. 3.1-3.7.

(Continued)

*Primary Examiner*—David B Lugo
(74) *Attorney, Agent, or Firm*—Ronald J. Meetin

(57) ABSTRACT

A receiver system contains an analog pre-filter (207 or 619), an analog-to-digital converter (210), a digital equalizer (212), and a decoder (605) arranged sequentially for processing an input analog signal ($y_k$). The pre-filter produces a filtered analog signal ($Z_s$) with reduced intersymbol interference. The converter provides analog-to-digital signal conversion. Digital equalization circuitry in the equalizer operates according to a transfer frmnction $$c_{-1}z + c_0 + \sum_{i=1}^{M} c_i z^{-i}$$

to produce an equalized digital signal ($a'_k$) as a stream of equalized digital values. Coefficients $c_{-1}$ and $c_0$ are fixed. Each other coefficient $c_i$ is adaptively chosen. The decoder converts the equalized digital values, or intermediate values generated therefrom, into a stream of symbols. A receiver system may include two or more receivers each configured in the foregoing way with the digital equalization circuitry in each receiver operating according to a transfer function $$\sum_{i=-N}^{M} c_i z^{-i}$$

where at least coefficients $c_{-1}$, $c_0$, and $c_1$ are non-zero.

64 Claims, 9 Drawing Sheets

U.S. PATENT DOCUMENTS

| | | | |
|---|---|---|---|
| 6,003,051 A | 12/1999 | Okazaki | 708/3 |
| 6,047,024 A | 4/2000 | How | 375/229 |
| 6,115,418 A | 9/2000 | Raghavan | 375/233 |
| 6,118,814 A | 9/2000 | Friedman | 375/232 |
| 6,185,263 B1 | 2/2001 | Chan | 375/295 |
| 6,226,332 B1 | 5/2001 | Agazzi et al. | 375/288 |
| 6,289,063 B1 | 9/2001 | Duxbury | 375/348 |
| 6,373,908 B2 | 4/2002 | Chan | 375/346 |
| 6,400,760 B1 | 6/2002 | Gu et al. | 375/232 |
| 6,421,381 B1 | 7/2002 | Raghavan | 375/233 |
| RE37,826 E | 9/2002 | Samueli et al. | 370/402 |
| 6,452,990 B1 | 9/2002 | Leis et al. | 375/361 |
| 6,542,477 B1 | 4/2003 | Pal et al. | 370/286 |
| 6,795,494 B1 | 9/2004 | Phanse et al. | 375/219 |
| 6,798,827 B1 | 9/2004 | Phanse | 375/219 |
| 6,798,828 B1 | 9/2004 | Phanse | 375/219 |
| 6,823,028 B1 | 11/2004 | Phanse | 375/345 |
| 6,975,674 B1 | 12/2005 | Phanse et al. | 375/219 |
| 6,980,644 B1 | 12/2005 | Sallaway et al. | 379/391 |
| 7,065,133 B1 | 6/2006 | Phanse et al. | 375/219 |
| 7,254,198 B1 * | 8/2007 | Manickam et al. | 375/348 |

OTHER PUBLICATIONS

Korn, *Digital Communications* (Von Nostrand Reinhold Co.), 1985, pp. 586-587.

Lee et al., *Digital Communications* (Kluwer Acad. Pubs.), 1988, pp. 34-42 and 319-345.

Oppenheim et al., *Discrete-time Signal Processing* (Prentice-Hall), 1989, pp. 149-191.

Rappaport, *Wireless Communications: Principles and Practice* (Prentice-Hall), 1996, pp. 310-311.

Stanley, *Digital Signal Processing* (Reston Pub.), 1975, pp. 163-168 and 211-213.

* cited by examiner

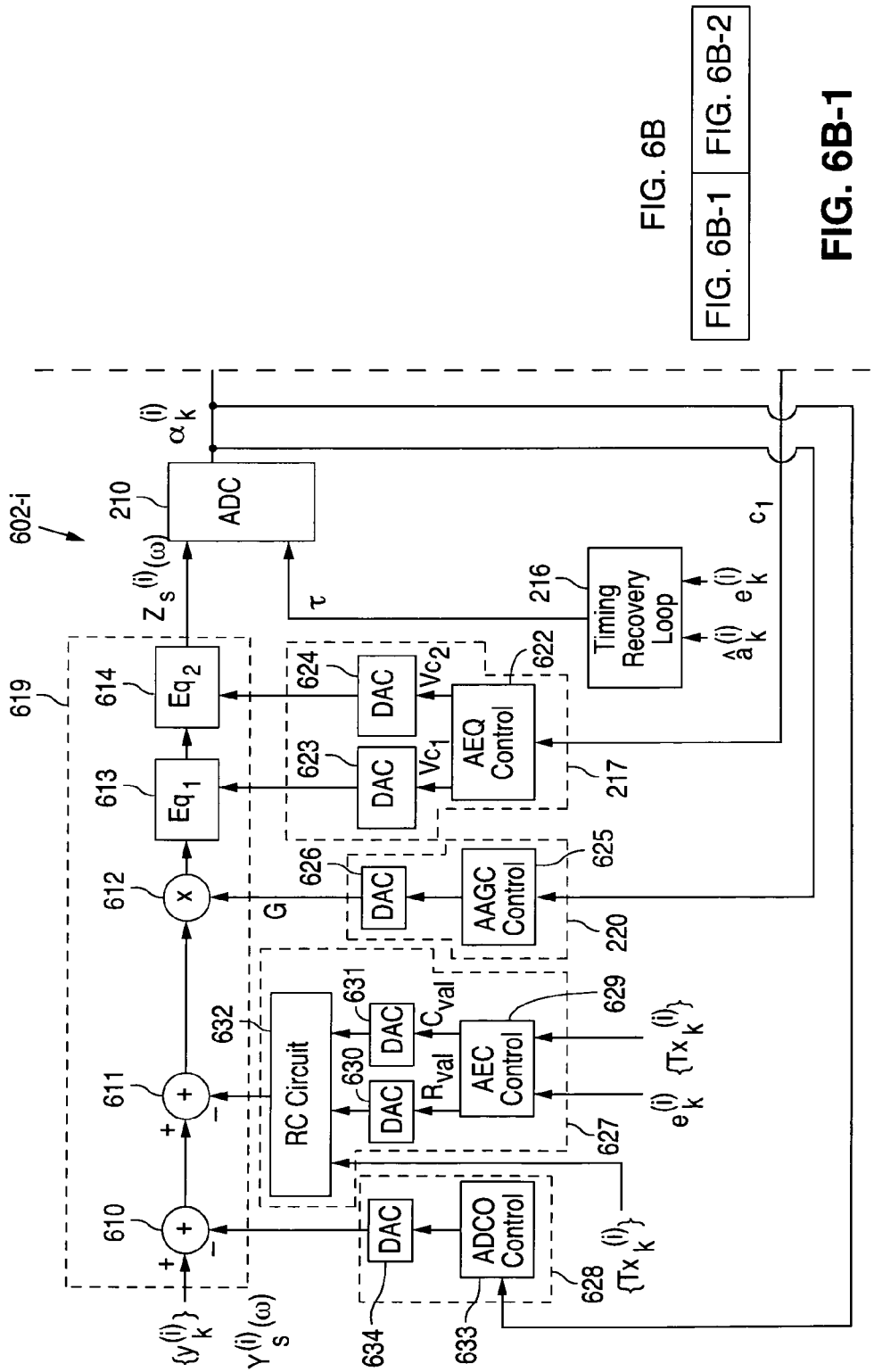

RECEIVER SYSTEM HAVING ANALOG PRE-FILTER AND DIGITAL EQUALIZER

CROSS-REFERENCE TO RELATED APPLICATION

This is a continuation of U.S. patent application Ser. No. 09/561,086, filed Apr. 28, 2000, now U.S. Pat. No. 7,254,198 B1.

FIELD OF THE INVENTION

This invention relates to digital communication systems and, more particularly, to an optimal architecture for receiver processing.

BACKGROUND

The dramatic increase in desktop computing power driven by intranet-based operations and the increased demand for time-sensitive delivery between users has spurred development of high speed Ethernet local area networks (LANs). 100BASE-TX Ethernet (see IEEE Std. 802.3u-1995 CSMA/CD Access Method, Type 100 Base-T) using existing category 5 (CAT-5) copper wire, and the newly developing 1000BASE-T Ethernet (see IEEE Draft P802.3ab/D4.0 Physical Layer Specification for 1000 Mb/s Operation on Four Pairs of Category 5 or Better Twisted Pair Cable (1000 Base-T)) for gigabit-per-second transfer of data over category 5 data grade copper wiring, require new techniques in high speed symbol processing. On category 5 cabling, gigabit-per-second transfer can be accomplished utilizing four twisted pairs and a 125 megasymbol-per-second transfer rate on each pair where each symbol represents two bits.

Physically, data is transferred using a set of voltage pulses where each voltage represents one or more bits of data. Each voltage in the set is referred to as a symbol and the whole set of voltages is referred to as a symbol alphabet.

One system of transferring data at high rates is Non-Return-to-Zero (NRZ) signaling. In NRZ, the symbol alphabet {A} is {−1, +1}. A logical "1" is transmitted as a positive voltage while a logical "0" is transmitted as a negative voltage. At 125 megasymbols per second, the pulse width of each symbol (the positive or negative voltage) is 8 ns.

An alternative modulation method for high speed symbol transfer is Multilevel Threshold-3 (MLT3) and involves a three-level system. (See American National Standard Information System, Fibre Distributed Data Interface (FDDI)-Part: Token Ring Twisted Pair Physical Layer Medium Dependent (TP-PMD), ANSI X3.263:199X.) The symbol alphabet {A} for MLT3 is {−1, 0, +1}. In MLT3 transmission, a logical "1" is transmitted by either a −1 or a +1 while a logical "0" is transmitted as a 0. A transmission of two consecutive logical "1"s does not require the system to pass through zero in the transition. A transmission of the logical sequence ("1", "0", "1") results in transmission of the symbols (+1, 0, −1) or (−1, 0, +1), depending on the symbols transmitted prior to this sequence. If the symbol transmitted immediately prior to the sequence was a +1, the symbols (+1, 0, −1) are transmitted. If the symbol transmitted before this sequence was a −1, the symbols (−1, 0, +1) are transmitted. If the symbol transmitted immediately before this sequence was a 0, the first symbol of the sequence transmitted will be a +1 if the previous logical "1" was transmitted as a −1 and will be a −1 if the previous logical "1" was transmitted as a +1.

The detection system in the MLT3 standard, however, needs to distinguish between three levels, instead of two levels as in a more typical two-level system. The signal-to-noise ratio required to achieve a particular bit error rate is higher for MLT3 signaling than for two-level systems. The advantage of the MLT3 system, however, is that the energy spectrum of the emitted radiation from the MLT3 system is concentrated at lower frequencies and therefore more easily meets FCC radiation emission standards for transmission over twisted pair cables. Other communication systems may use a symbol alphabet having more than two voltage levels in the physical layer in order to transmit multiple bits of data using each individual symbol. In Gigabit Ethernet over twisted pair CAT-5 cabling, for example, five-level Pulse-Amplitude Modulation (PAM-5) data can be transmitted at a baud rate of 125 megabaud. (See IEEE Draft P802.3ab/D4.0 Physical Layer Specification for 1000 Mb/s Operation on Four Pairs of Category 5 or Better Twisted Pair Cable (1000 Base-T).)

Therefore, there is a necessity for a receiver capable of receiving signals having large intersymbol interference from long transmission cables. There is also a necessity for reducing the difficulties associated with digital equalization of signals with large intersymbol interference without losing the equalization versatility required to optimize the receiver.

SUMMARY OF THE INVENTION

In accordance with the invention, a receiver system for providing signal equalization is partitioned into an analog pre-filter and a digital receiver. At least some of the intersymbol interference is removed from the signal by the analog pre-filter before the signal is processed through a digital equalizer in the digital receiver. Signals having a large amount of intersymbol interference, such as those transmitted through long cables, are preprocessed through the pre-filter, thereby reducing the difficulties of digital equalization without losing the versatility of the digital equalizer.

Embodiments of the invention can include any equalization scheme, including linear equalization, decision feedback equalization, trellis decoding and sequence decoding, separately or in combination. Embodiments of the invention may also include cable quality and cable length indication and baseline wander correction. Further, embodiments of receivers according to the present invention can also include echo cancellation and near end crosstalk (NEXT) cancellation.

These and other embodiments of the invention are further explained below along with the following figures.

In the figures, elements having similar or identical functions have identical identifiers.

DETAILED DESCRIPTION OF THE INVENTION

Figure 1A:
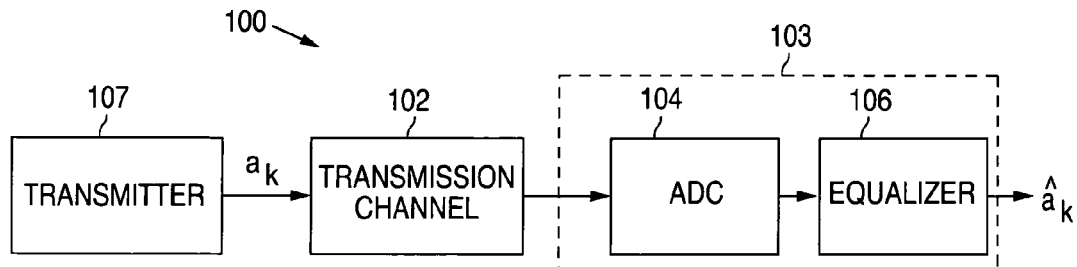
FIG. 1A shows a transmission system with an entirely digital equalizer in the receiver.

FIG. 1A shows a block diagram of a typical transmission system 100 for a single-wire transmission channel. Transmission system 100 includes transmitter 107, transmission channel 102 and receiver 103. Transmitter 107 transmits a symbol stream $\{a_k\}$ and can perform some signal shaping on the waveform formed by symbol stream $\{a_k\}$. Notationally, a particular symbol in clock cycle k is denoted without brackets as $a_k$ whereas the symbol sequence or stream is denoted with curly brackets as $\{a_k\}$.

Transmission channel 102 which can be any transmission medium distorts the transmitted waveform, creates intersymbol interference, and adds noise to the transmitted signal. Receiver 103 receives the transmitted signals from transmission channel 102. Receiver 103 includes an analog-to-digital converter (ADC) 104 and an equalizer 106 connected in series. In receiver 103 of FIG. 1A, the equalization of an input signal to receiver 103 is accomplished digitally. Digital equalization becomes problematic as the cable length increases due to the large intersymbol interference associated with longer cables.

In general, a signal received by receiver 103 includes contributions from several transmitted symbols as well as noise and channel distortions. Each transmitted symbol is diffused in the transmission process so that it is commingled with symbols being transmitted at later transmission times. This effect is known as "intersymbol interference" (ISI). (See E. A. LEE and D. G. MESSERCHMITT, DIGITAL COMMUNICATIONS (1988).)

Intersymbol interference is a result of the dispersive nature of the communication channel. The IEEE LAN standards require that LAN communication systems be capable of transmitting and receiving data through at least a 100 meter cable. In a 100 meter cable, the signal strength at the Nyquist frequency of 62.5 Mhz is reduced nearly 20 db at the receiving end of the cable. Given this dispersion, a single symbol may affect symbols throughout the transmission cable of transmission channel 102.

An input signal $x_k$ to receiver 103 at sample time k, neglecting channel distortion and noise, can be digitally represented as $$x_k = C_0 a_k + C_1 a_{k-1} + \cdots + C_j a_{k-j} \cdots, \quad (1)$$

where $a_{k-j}$ represents the (k−j)th symbol in the symbol sequence and coefficient $C_j$ represents the contribution of the (k−j)th symbol to signal $x_k$. Equalizer 106 receives digitized sample $x_k$ and deduces currently received symbol $\hat{a}_k$ by removing, usually adaptively, the contribution of previous symbols $a_{k-j}$ from detected sample $x_k$ (i.e., by removing the intersymbol interference). The deduced symbol $\hat{a}_k$ represents the best estimation by receiver 103 as to what the transmitted symbol $a_k$ was.

However, with long cable lengths, the contribution of earlier received symbols becomes significant. For example, with cable lengths above about 100 meters, coefficient $C_1$ for immediately previous symbol $a_{k-1}$ can be as high as 0.95 (i.e., 95% of symbol $a_{k-1}$ may be represented in the input signal). Contributions from other previous symbols can also be high. Given that equalizer 106 cannot adjust for the contribution of symbols not yet received (e.g., the kth detected sample cannot include contributions from the (k+1)th transmitted symbol), equalizer 106 has a difficult time distinguishing the kth and the (k−1)th symbol under these circumstances. An adaptive receiver can have particular difficulty upon startup in distinguishing the contribution of the kth symbol from the contribution of the (k−1)th symbol and in determining the equalizer parameters corresponding to the mixing parameters $\{C_j\}$.

Therefore, for large cable lengths a digital equalizer is faced with deducing the current symbol from a sample containing significant contributions from numerous previously received symbols. The difficulty is not only deducing the symbols but in adaptively choosing the operating parameters of the equalizer in order to optimize the performance of receiver 103.

Figure 1B:
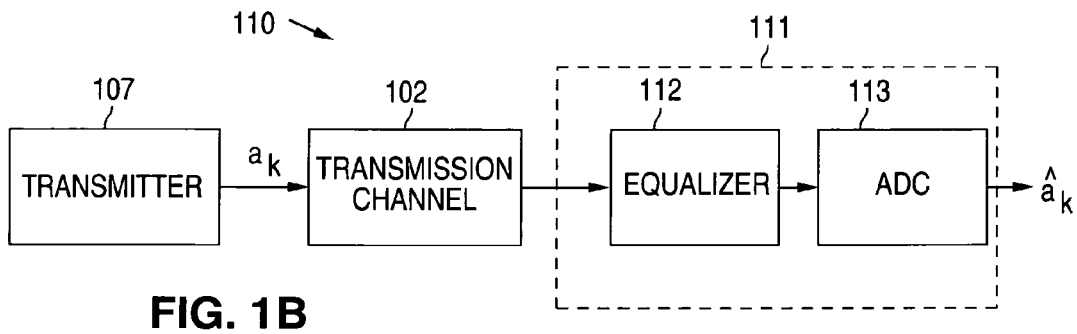
FIG. 1B shows a transmission system with an entirely analog equalizer in the receiver.

An alternative approach to digital equalization is analog equalization. FIG. 1B shows a block diagram of a transmissive system 110 having an analog receiver 111 coupled to transmission channel 102. Receiver 111 includes an analog equalizer 112 having an analog filter tailored to remove intersymbol interference from the received signal. Although having the advantage of processing loop speed, equalizer 112 cannot be adaptively optimized for the performance of receiver 111.

Figure 2B:
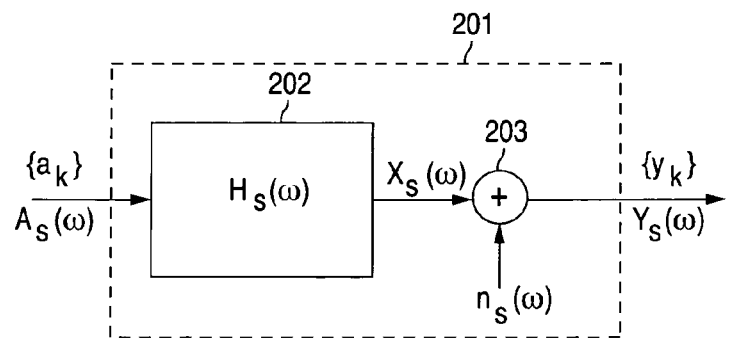
FIG. 2B shows an analog model of a transmission channel.
Figure 2A:
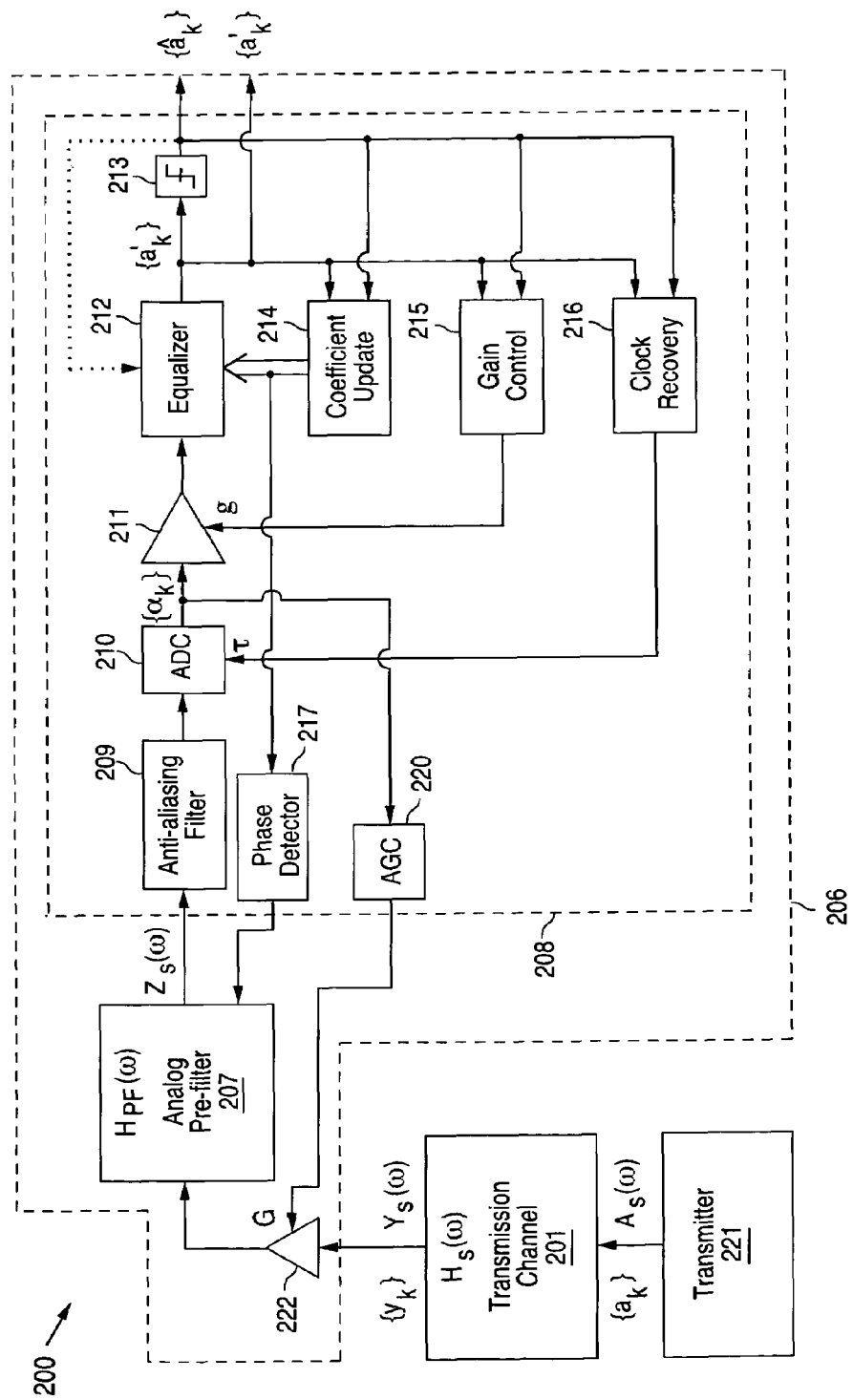
FIG. 2A shows a transmission system that contains a receiver system according to the present invention.

FIG. 2A shows a transmission system 200 according to the present invention. Transmission system 200 includes a transmitter 221, a transmission channel 201 and a receiver system 206. Transmitter 221 outputs a symbol stream $\{a_k\}$ to transmission channel 201. Transmitter 221 can output symbol stream $\{a_k\}$ directly or, in some embodiments of the invention, perform some pre-processing of the waveform formed by the sequential transmission of the symbol stream $\{a_k\}$.

Transmission channel 201 represents the transmission of a signal between transmitter 221 and receiver 206 and can include any transmission medium, including twisted copper, coaxial cable or optical fiber. The symbol stream $\{a_k\}$ can be composed of any symbol alphabet, including NRZ, MLT3, PAM-5 (where the symbol alphabet is given by $\{-2, -1, 0, 1, 2\}$) or any other symbol alphabet and modulation that are used in transceivers such as transmission system 200.

Transmission system 200 may be a portion of a larger transceiver system. In general, transceivers of this type may have any number of transmission channels similar to transmission channel 201. For example, gigabit-per-second transfer of data can be accomplished using four transmission channels, each with one twisted pair cable. Further, transmission channels such as transmission channel 201 can be bi-directional, i.e., transmit data in both directions. For example, receiver 206 may be associated with a transmitter that transmits symbol streams to other receivers coupled to the same cable as is included in transmission channel 201. Any number of transmitters and receivers may be coupled to the cable associated with transmission channel 201. Each coupling may affect the response of transmission channel 201.

The transmitted symbols in the sequence $\{a_k\}$ are members of the symbol alphabet $\{A\}$. In the exemplary case of PAM-5 signaling, the symbol alphabet $\{A\}$ is given by $\{-2, -1, 0, +1, +2\}$. The index k again represents the time index for each transmitted symbol, i.e., at sample time k, the symbol being transmitted to transmission channel 201 is given by $a_k$.

The real-time output of transmitter 221 can be represented as $A_s(\omega)$, where $A_s(\omega)$ is the Fourier transform of the analog signal $a_s(t)$ that represents the symbol stream $\{a_k\}$. Therefore, $$A_s(\omega) = \int_{-\infty}^{\infty} a_s(t)e^{-j\omega t}dt. \tag{2}$$

Signal $a_s(t)$ also represents the effects of any pre-shaping that may be performed by transmitter 221.

The output signal $y_k$ or $Y_s(\omega)$ from transmission channel 201, now treated as an analog signal, suffers from channel distortion, the addition of random noise, and a flat signal loss. Referring to FIG. 2A, channel output signal $Y_s(\omega)$ is the Fourier transform of the analog signal that represents the output signal stream $\{y_k\}$ from transmission channel 201. Channel output signal $y_k$ or $Y_s(\omega)$ is input to receiver 206.

As shown in FIG. 2B, transmission channel 201 can be modeled as having a linear, time invariant portion 202 with transfer function $H_s(\omega)$ and a noise portion represented as noise adder 203. The transfer function $H_s(\omega)$ includes the effects of transmit and receive transformers and the transmission medium (e.g., cable) on the transmitted signal. The input signal $A_s(\omega)$ to transmission channel 201 and thus to portion 202 is related to the output signal $X_s(\omega)$ of portion 202 by the relationship $$X_s(\omega)=H_s(\omega)A_s(\omega). \tag{3}$$

The total output signal $Y_s(\omega)$ from transmission channel 201 then is $$Y_s(\omega)=H_s(\omega)A_s(\omega)+n_s(\omega), \tag{4}$$

where $n_s(\omega)$ is a random noise component. Equations 3 and 4 assume a linear, time invariant transmission system.

For long cable lengths, the intersymbol interference contained in signal $Y_s(\omega)$ can be severe, including significant portions of previously transmitted symbols in $Y_s(\omega)$. For example, at a cable length of above about 100 meters, the contribution of the last sent symbol to the currently received signal may be as high as 95%.

Receiver system 206 contains an analog amplifier 222, a pre-filter 207, and a receiver 208 constituted as a digital filter. Amplifier 222 amplifies signal $y_k$ or $Y_s(\omega)$ from transmission channel 201. Pre-filter 207 is described in the immediately following paragraphs. Digital filter 208 contains an anti-aliasing filter 209, an analog-to-digital converter 210, a digital amplifier 211, a digital equalizer 212, a slicer 213, a coefficient update 214, a digital automatic gain control 215, a clock recovery 216, a phase detector 217, and an analog automatic gain control 220. Similar to how components 217 and 220 are depicted in FIG. 6B below, components 217 and 220 could be described as outside digital filter 208 since their output signals go to components that precede digital filter 208.

Pre-filter 207 receives the amplified signal from amplifier 222 and pre-shapes that signal for input to digital filter (receiver 208). The pre-shaping performed by pre-filter 207 can include partial removal of intersymbol interference so that less intersymbol interference remains to be removed by digital equalizer 212.

Pre-filter 207 can be designed based on frequency-sampling methods in which a desired frequency response is uniformly sampled and filter coefficients are then determined from these samples using an inverse discrete Fourier transform. For example, one embodiment of pre-filter 207 includes a one-zero two-pole filter having a frequency response of approximately the inverse of, for example, the transfer function $H_s(\omega)$ associated with a 50 meter cable (CAT-5) in combination with any pre-shaping that may have been performed by transmitter 221. Pre-filter 207, therefore, can be fixed to remove the influence of intersymbol interference from a given cable configuration, e.g., a twisted-copper pair having a particular length. Variations in the intersymbol interference inherent in variations of the cable or its length from that expected can be accommodated by adaptive functions in digital equalizer 212.

Although pre-filter 207 can be any number of filters coupled in series, pre-filter 207 can be represented with a transfer function $H_{PF}(\omega)$ that represents the effects on an input signal of all of the filters in pre-filter 207. Therefore, assuming that pre-filter 207 is linear and time-invariant, the Fourier transform output signal $Z_s(\omega)$ from pre-filter 207 is given by $$Z_s(\omega)=GH_{PF}(\omega)Y_s(\omega), \tag{5}$$

where G is the analog gain of analog amplifier 222. The transfer function $H_T(\omega)$ that represents the combination of transmission channel 201, amplifier 222, and pre-filter 207 is given by $$H_T(\omega)=GH_s(\omega)H_{PF}(\omega). \tag{6}$$

Ideally, if pre-filter 207 completely compensates for transmission channel 201, the total transfer function $H_T(\omega)$ is unity. In a practical transmission system, the transfer function $H_{PF}(\omega)$ of pre-filter 207 is determined by inverting the predicted or measured transfer function $H_s(\omega)$ of transmission channel 201.

The frequency response $H_c(f,l)$ of the complete channel, i.e., transmission system 200 including transmission channel 201 and digital filter 208, neglecting random noise $n_s(\omega)$ and not including the frequency response of pre-filter 207, can be modeled as $$H_c(f,l)=H_{PR}(z)H_s(f,l)H_{EQ}(z)gGH_{co}(f) \tag{7}$$

where $H_{PR}(z)$ is the partial response shaping accomplished by transmitter 221 before transmission, z equals $e^{j\omega T}$, $\omega$ equals $2\pi f$, f is the frequency, and T is the symbol (and sampling) interval. $H_s(f,l)$ is the frequency response of transmission channel 201, e.g., the CAT-5 cable, of length l and the transmit and receive transformers. In one embodiment, the partial response shaping $H_{PR}(z)$ equals $0.75+0.25z^{-1}$ where $z^{-1}$ represents a one-symbol period delay. $H_{EQ}(z)$ is the transfer function of digital equalizer 212 and is generally given by $$\sum_{i=-N}^{M} c_i z^{-i}$$

where N and M are positive integers. Inasmuch as $z^{-1}$ represents a one-symbol period delay, z represents a one-symbol period advance. In one embodiment, equalizer transfer function $H_{EQ}(z)$ is chosen to be $c_{-1}z+c_0+c_1z^{-1}$. The parameter g is the output gain of automatic gain control (AGC) 215 in digital filter 208. $H_{co}(f)$ represents the frequency response of the remaining elements of the complete channel, e.g., analog-to-digital converter 210 (whose pulse can be a rectangular pulse of length T or a trapezoidal pulse with rising and falling edges of length T/2 and flat portion of length T/2) and other elements of transmission channel 201.

The frequency response $H_s(f,l)$ of transmission channel 201 is a function of cable length l. Both gain g and digital equalizer transfer function $H_{EQ}(z)$ depend on cable length l. The gain g is increased for increased cable length l due to increased signal loss. The coefficient parameters $c_{-1}$, $c_0$, and $c_1$ of equalizer transfer function $H_{EQ}(z)$ also depend on cable length l. Channel-remainder frequency response $H_{co}(f)$ is not a function of cable length l.

Figure 3A:
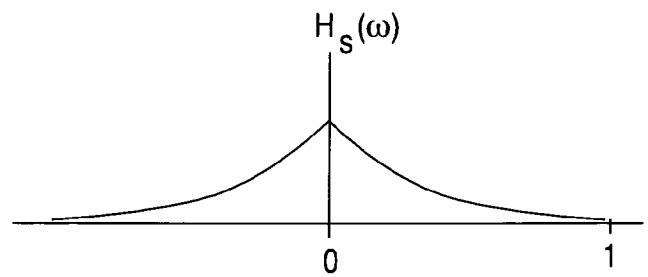
FIG. 3A shows an exemplary transfer function representing a transmission channel.
Figure 3B:
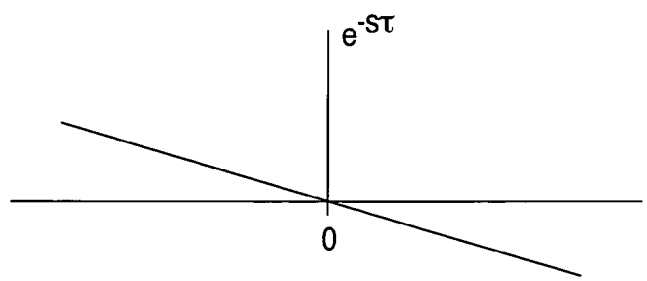
FIG. 3B shows the exponential component of the signal distortion.
Figure 3C:
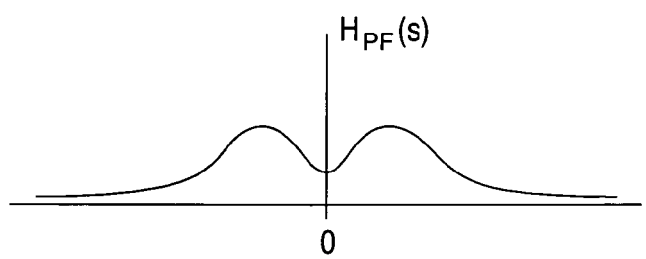
FIG. 3C shows an exemplary transfer function of a pre-filter according to the present invention.
Figure 3D:
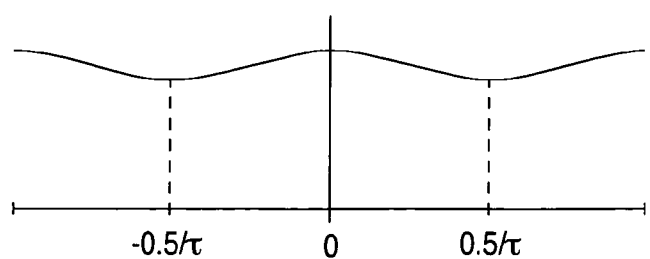
FIG. 3D shows the combined influence of the functions shown in FIGS. 3A, 3B and 3C on an input signal.

Examples of the frequency response for transmission system 200 are shown in FIGS. 3A through 3D. FIG. 3A shows the transfer function $H_s(\omega)$ of transmission channel 201. As shown in FIG. 3A, transmission-channel transfer function $H_s(\omega)$ approaches zero asymptotically. FIG. 3B shows signal $e^{-s\tau}$ where s equals $j\omega$, and $\tau$ is the timing phase difference discussed below. FIG. 3C represents the transfer function $H_{PF}(s)$ of pre-filter 207. FIG. 3D represents the total frequency response or the product of the signals represented in FIGS. 3A, 3B and 3C.

The frequency response $H_c(f,l)$ of the complete channel does not include the effects of pre-filter 207. The transfer function $H_{PF}(s)$ of analog pre-filter 207 can be represented by $(b_1 s+1)/(a_s s^2 + a_1 s+1)$, where s again equals $j\omega$. Pre-filter transfer function $H_{PF}(s)$, therefore, is characterized by the filter parameters $b_1$, $a_1$, and $a_2$. Transfer function $H_{PF}(s)$ can be determined by minimizing a cost function that is related to the total intersymbol interference found in transmission system 200.

A measure E(l) of the intersymbol interference due to the comparison of the folded spectrum with a flat spectrum can be expressed as $$E(l) = \int_{-1/2T}^{1/2T} |[H_c(f, l) H_{PF}(s) e^{j\omega\tau}]_{fold} - 1|^2 df. \tag{8}$$

The parameter $\tau$ is the timing phase difference between the transmitter digital-to-analog converter (not shown) and the receiver analog-to-digital converter (ADC) 210 as calculated by clock recovery 216. The integral in Equation 8 represents the inverse discrete Fourier transform of all signals received in one period, e.g., −0.5/T to 0.5/T. The folded spectrum in the integral can be described by spectrum folding, which can be defined as $$[X(f)]_{fold} = \frac{1}{T} \sum_i X\left(f - \frac{i}{T}\right), \tag{9}$$

where X(f) is any general function of frequency.

In one embodiment, the transfer function $H_{PF}(s)$ of analog pre-filter 207 is obtained by minimizing the cost function C given as $$C = \sum_{i=1}^{K} w_i E(l_i) + w_{K+1} P \tag{10}$$

with respect to the filter parameters $b_1$, $a_1$, and $a_2$ where $w_i$ is a weight factor, $l_i$ is the ith cable length, K is the number of cable lengths, and P is a high frequency penalty. The first K terms are a measure of intersymbol interference at cable lengths $l_1, l_2, \ldots l_K$. In one embodiment, K equals 3. Although any number K of cable lengths can generally be used, minimizing cost function C for K equal to 1 results in an implementation of pre-filter 207 optimized for only one cable length. Alternatively, using too many cable lengths complicates the optimization.

The last term P in Equation 10, $$P = \int_{1/2T}^{\infty} |H_{PF}(s)|^2 df \tag{11}$$

imposes an additional penalty on the high frequency components of pre-filter transfer function $H_{PF}(s)$. The high frequency penalty P operates to attenuate high frequency echoes. Other factors can be included in a cost function. For example, a term to reduce quantization noise can be added. This quantization term would be proportional to g $\sqrt{c_1^2 + c_2^2 + \ldots + c_K^2}$.

Each term in the cost shown in Equation 10 is weighted by a weight factor $w_i$. These weights specify the importance of each term. The weights are chosen such that the peak magnitude of pre-filter transfer function $H_{PF}(s)$ is not too large and so that transfer function $H_{PF}(s)$ is small at high frequencies. The analog pre-filter 207 determined by transfer function $H_{PF}(s)$ found by optimizing cost function C of Equation 10 minimizes the intersymbol interference for cable lengths $l_1$ through $l_K$ and attenuates high frequency echo signals.

As previously described, transmission-channel transfer function $H_s(\omega,l)$, gain g, and equalizer transfer function $H_{EQ}(z)$ all depend on cable length l. Timing phase difference $\tau$ from clock recovery 216 also depends on cable length l. Therefore, intersymbol interference measures $E(l_1)$ through $E_{(lK)}$ are all different. The parameters G, g, $\tau$, the equalizer parameters in equalizer transfer function $H_{EQ}(z)$ (e.g., $c_{-1}$, $c_0$, and $c_1$), and the measurement parameters in intersymbol interference measures $E(l_1)$ through $E(l_K)$ are those parameters that the adaptive loops in analog gain control 220, gain control 215, clock recovery 216, and coefficient update 214 converge for cable lengths $l_1$ through $l_K$, respectively.

Minimizing intersymbol interference measure E(l) with respect to parameters $b_1$, $a_1$, and $a_2$ should enable transfer function $H_{PF}(s)$ for pre-filter 207 to produce a flat folded spectrum if the cable length is l. However, this is based on the assumption that the actual equalizer parameters for equalizer transfer function $H_{EQ}(z)$, analog gain G, digital gain g, and timing phase $\tau$ are the same as those used in Equation 8 for measure E(l). If they are different, the results are less useful.

The better determination of equalizer parameters for equalizer transfer function $H_{EQ}(z)$, gain g, and timing phase $\tau$ is found by an iterative procedure as described below, resulting in determination of pre-filter transfer function $H_{PF}(s)$. With an initial choice of equalizer parameters for equalizer transfer function $H_{EQ}(z)$, gain g, and timing phase $\tau$, the cost function C is minimized to determine an initial version of pre-filter transfer function $H_{PF}(s)$. Using this $HP_{PF}(s)$ version, the equalizer parameters for equalizer transfer function $H_{EQ}(z)$, gain g, and timing phase $\tau$ are determined for each cable length $l_1$ through $l_K$. Using these new sets of equalizer parameters for transfer function $H_{EQ}(z)$, gain g, and timing phase $\tau$ (one set of parameters for each cable length $l_1$ through $l_K$) in the cost function C, pre-filter transfer function $H_{PF}(s)$ is recomputed. This process is repeated until there are no significant changes between successive iterations. In other words, the above procedure converges to a particular set of filter parameters for transfer function $H_{PF}(s)$ that determines pre-filter 207.

In one case, transmission-channel transfer function $H_s(\omega)$ includes the frequency response of the transmit and receive transformers, each of which is modeled as a first order transfer function with −3 dB cutoff at 100 MHz. Additionally, transmission channel 201 is a category-5 twisted copper pair cable, equalizer transfer function $H_{EQ}(z)$ equals $c_{-1}z+c_0+c_1z^{-1}$, partial response shaping $H_{PR}(z)$ equals $0.75+0.25z^{-1}$, and pulse length T equals 8 ns. The optimization of the cost function C in Equation 10 with K equal to 3 and cable lengths $l_1$ equal to 0 m, $l_2$ equal to 50 m, and $l_3$ equal to 120 m leads to filter transfer function $H_{PF}(s)$ for pre-filter 207 described by $$H_{PF}(s) = \frac{0.8077\hat{s}+1}{0.1174\hat{s}^2 + 0.1255\hat{s} + 1}, \quad (12)$$

where $\hat{s}$ equals sT.

Alternatively, pre-filter 207 can be an adaptive analog filter. Transfer function $H_{PF}(s)$ for an adaptive analog version of pre-filter 207 can be of the form $$H_{PF}(s) = (1-V_c) + V_c PF(s) \quad (13)$$

and is controlled by the single parameter $V_c$ where PF(s) is an analog filter function. The parameter $V_c$ is varied in the range $0 < V_c < 1$ to achieve partial equalization for various cable lengths. If $V_c$ equals 0, pre-filter transfer function $H_{PF}(s)$ is 1 (unity), i.e., no equalization is performed by pre-filter 207. If $V_c$ equals 1, transfer function $H_{PF}(s)$ is analog filter function PF(s), i.e., maximum attainable equalization is achieved by the filter structure defined by analog function PF(s) for pre-filter 207. As $V_c$ is varied linearly from 0 to 1, pre-filter transfer function $H_{PF}(s)$ varies from unity to analog function PF(s).

Analog filter function PF(s) can represent a band-pass or high-pass filter. Therefore, the peak magnitude of the frequency response of pre-filter transfer function $H_{PF}(s)$ increases with increasing $V_c$. If analog function PF(s) performs suitable equalization for a particular cable length $l_0$, pre-filter 207 with $V_c < 1$ performs suitably for cable length $l < l_0$. Hence $V_c$ is monotonic with cable length l.

For example, analog filter function PF(s) can have one zero and two poles (complex-conjugate pair) in the form $$PF(s) = \frac{\omega_n^2}{\omega_z} \cdot \frac{s + \omega_z}{s^2 + 2\delta\omega_n s + \omega_n^2}, \quad (14)$$

where $\omega_z$ is the zero frequency, $\omega_n$ is the pole frequency, and $\delta$ is a damping factor.

At low frequency, the filter described by Equation 14 starts from unity and rolls off as 1/s at high frequencies. Hence the filter passes less noise and high frequency echo. Moreover, a small order PF(s) requires fewer resistors, capacitors, and operational amplifiers to realize the circuit, which implies less sources of circuit noise and also easier and cheaper implementation for pre-filter 207. In another embodiment, analog filter function PF(s) is the optimized analog filter function that optimizes the cost C described in Equation 10 for one cable length where that length is the maximum targeted cable length. Parameter $V_C$ can be adapted, then, to shorter cable lengths.

To minimize the peak magnitude of the filter structure $H_{PF}(s)$, two stages of filter structures, namely pre-filter transfer function $H_{PF}(s)$ equals $H_1(s)H_2(s)$ where $H_1(s)$ and $H_2(s)$ are the respective transfer functions for a pair of cascaded analog filters, can be utilized. In this case, $$H_1(s) = (1-V_{c1}) + V_{c1} PF(s), \quad (15)$$

and $$H_2(s) = (1-V_{c2}) + V_{c2} PF(s). \quad (16)$$

For example, analog filter function PF(s) could be a one-zero two-pole filter with the zero at 30 MHz and complex-conjugate pair poles at 70 MHz with a damping factor of 0.4. That is, zero frequency $\omega_z$ equals $60\pi \times 10^6$ radians/sec., pole frequency $\omega_n$ equals $140\pi \times 10^6$ radians/sec., and damping factor $\delta$ equals 0.4 in Equation 14 above. A cascade of filter transfer functions $H_1(s)$ and $H_2(s)$ each with the above PF(s) analog function can provide good partial equalization for a wide range of cable lengths.

In one embodiment, the digital equalizer transfer function $H_{EQ}(z)$ executed by equalizer 212 can be expressed in the form $$H_{EQ}(z) = c_{-1}z + c_0 + c_1 z^{-1} + c_2 z^{-2} + \ldots + c_K z^{-K} \quad (17)$$

The first coefficients $c_{-1}$ and $c_0$ can be fixed (i.e., coefficient update 214 does not alter coefficient $c_{-1}$ or $c_0$). For example, the first two equalizer coefficients can be set as $c_{-1}$ equal to $-1/8$ and $c_0$ equal to 1. The remaining equalizer coefficients $c_1$ through $c_K$ are adaptively chosen by coefficient update 214. The parameter K can be any positive integer. For a fixed (non-adaptive) analog filter, equalizer coefficient $c_1$ decreases monotonically with cable length. Therefore, equalizer coefficient $c_1$ is a good indicator of cable length. Additionally, AGC gain g is also a good indicator of cable length. Equalizer coefficient $c_1$ or gain g can be compared to a threshold $Th_{AEQ}$ and the result of that comparison used to adapt analog pre-filter 207.

In FIG. 2A, phase detector 217 executes an updating algorithm with equalizer coefficient $c_1$ in order to choose adaptive parameters for analog pre-filter 207. In phase detector 217, a phase detection parameter $PD_{AEQ}$ can be calculated by $$PD_{AEQ} = -(c_1 - Th_{AEQ}). \quad (18)$$

The amount of threshold $Th_{AEQ}$ determines how much equalization is performed in analog pre-filter 207 and how much is performed in digital equalizer 212. In one example, coefficient $c_1$ varies between about $-0.35$ to about $-1.0$ and threshold $Th_{AEQ}$ is chosen to be about $-0.4$.

Phase detector 217 operates to control pre-filter parameter $V_c$. In a cascading prefilter, phase detector 217 controls any number of adaptive analog filter parameters $V_{c1}$ through $V_{cN}$ where N is the total number of cascaded analog prefilters included in analog pre-filter 207. One method of adaptively choosing a value for parameter $V_c$ (or each of parameters $V_{c1}$ through $V_{cN}$) is to increment or decrement the value of $V_c$ based on whether the calculated phase detection parameter $PD_{AEQ}$ is positive or negative. Alternatively, phase detector 217 may include an accumulator that inputs the calculated parameter $PD_{AEQ}$ and outputs a signal that controls parameter $V_c$.

Additionally, in receiver (digital filter) 208 of FIG. 2A, analog AGC 220 and analog amplifier 222 scale the input signal to analog pre-filter 207, and thus input signal $Z_s(\omega)$ to digital filter 208, so that the entire dynamic range of ADC 210 is utilized while keeping the probability of saturation very low. Analog AGC 220 inputs the signal output of ADC 210.

Analog AGC 220 outputs a signal to amplifier 222 which adjusts the output level of pre-filter 207 to optimize the functionality of ADC 210. In one embodiment, AGC 220 calculates a phase detector parameter $PD_{AGC}$ for the loop, accumulates the results of the phase detect parameter calculation, and converts the accumulated phase detector parameter to an analog signal which is input by pre-filter 207. Phase detector parameter $PD_{AGC}$ for this loop can be defined as $$PD_{AGC}[k] = \alpha_{k,1} + \alpha_{k,2}, \quad (19)$$

where $$\alpha_{k,1} = \begin{pmatrix} -1 & \text{if } |\alpha_k| > Th_{AGC} \\ 0 & \text{otherwise} \end{pmatrix}, \quad (20)$$

$$\alpha_{k,2} = \begin{pmatrix} 1 & \text{if } k \bmod(N) = 0 \\ 0 & \text{otherwise} \end{pmatrix}. \quad (21)$$

Variable $\alpha_k$ is the output signal from ADC 210 during time period k, i.e., at time instant t equal to kT, and modulus number N is chosen to make use of the range of ADC 210.

At the convergence of the phase loop in AGC 220, i.e., the steady-state condition, the expected value of phase detection parameter $PD_{AGC}$ is 0. This ensures that the probability of $|\alpha_k|$ being greater than $Th_{AGC}$ is 1/N for any time period k. The threshold value $Th_{AGC}$ and modulus number N are suitably chosen to make good use of the A/D range. For the application of Gigabit Ethernet, $Th_{AGC}$ and N are chosen such that the probability of saturation of ADC 210 is less than about $10^{-6}$. In one example, $Th_{AGC}$ is about 0.8 of the range of ADC 210, for example, 50 in a 7 bit ADC, and N is about 1024.

In general, pre-filter 207 can be arranged to reduce or eliminate the intersymbol interference inherent in any length cable. Once a transfer function, such as that given in Equation 12 or 14, is determined for a particular configuration of transmission channel 201, one skilled in the art of filter design can construct the appropriate filter. Therefore, a transfer function such as that shown in Equation 12 or 14 completely describes an analog filter which can be utilized for equalization in pre-filter 207.

As shown in FIG. 2A, the analog signal output $Z_s(\omega)$, which is the input symbol sequence $\{a_k\}$ distorted by the transmission channel and filtered by pre-filter 207 in the above described fashion, is input to digital receiver 208. Anti-aliasing filter 209 receives analog signal $Z_s(\omega)$ from analog pre-filter 207. In most embodiments, anti-aliasing filter 209 is an analog low pass filter.

Analog-to-digital converter 210 is coupled to receive an output signal from anti-aliasing filter 209. ADC 210 can have any accuracy, but in most embodiments a six to eight bit converter is utilized. Due to pre-filter 207, the linearity, i.e., number of bits requirement of ADC 210 is reduced. For example, by using a 50-meter cable (CAT-5) plus transmit shaping, as described above, the ADC requirements can be significantly reduced if receiver 206 includes a pre-filter implementing the transfer function described by Equation 8. The requirements of ADC 210 may be reduced from an 8-bit ADC to a 6-bit ADC at 125 megasamples per second, for example.

By reducing the linearity of the ADC requirements, a linear equalizer is used in one embodiment rather than a decision feedback equalizer or a more complicated trellis decoder. In addition, by using pre-filter 207, critical timing loops normally associated with Gigabit receiver designs are eliminated. Experiment has shown that the time complexity of the critical path required to implement a 4D, 8-state trellis decoder in a Gigabit receiver is reduced. The reduction in complexity inherent in reducing the distortion in the signal input to digital receiver 208 can result in receivers having fewer components and simpler implementations.

Figure 4:
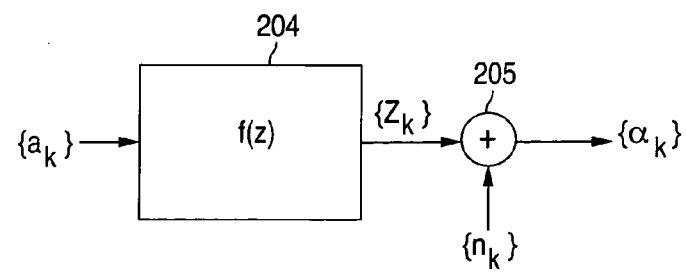
FIG. 4 shows a discrete time model of signal transmission through a transmission channel in combination with a pre-filter according to the present invention.

A discrete-time model of the response of transmission channel 201 in combination with pre-filter 207 is shown in FIG. 4 and includes a channel response 204, represented by the channel function (f(z), and a noise adder 205. Noise adder 205 represents addition of a random noise factor $n_k$ to the transmitted signal. The discrete-time model is particularly applicable for digital receiver 208. In that case, transfer function f(z) is a folded spectrum of the combined frequency response $H_{PR}(z)H_s(\omega)H_{PF}(\omega)H_{co}(\omega)$.

It is assumed that the channel model includes the effect of transmit and receive filtering. In addition, transmission channel 201 is assumed to be linear in that two overlapping signals simply add as a linear superposition. Therefore, the channel function polynomial f(z) of channel response 204 can be defined as $$f(z) = f_0 + f_1 z^{-1} + f_2 z^{-2} + \ldots + f_N z^{-N}, \quad (22)$$

where $f_0, \ldots, f_j, \ldots,$ and $f_N$ are the polynomial coefficients representing the dispersed component of the (k-j)th symbol present in the symbol $a_k$, $z^{-1}$ represents a one-symbol period delay, and N is a cut-off integer such that $f_j$ for j>N is negligible. The polynomial f(z) represents the frequency response of transmission channel 201 in combination with pre-filter 207. See A. V. OPPENHEIM & R. W. SCHAFER, DISCRETE-TIME SIGNAL PROCESSING 1989.

The noiseless output signal $x_k$ of transmission channel 201 at sample time k, i.e., the output signal from channel response 204, is then given by $$x_k = f_0 * a_k + f_1 * a_{k-1} + \ldots f_N * a_{k-N} \quad (23)$$

Thus, the channel output signal at time k depends, not only on transmitted data at time k, but also on past values of the transmitted data, i.e., there remains some intersymbol interference.

The noise element of the input signal, represented by noise adder 205, is represented by the sequence $\{n_k\}$. Therefore, the noisy output $\alpha_k$ of the channel, i.e., the output signal from ADC 210, is given by $$\alpha_k = x_k + n_k, \quad (24)$$

where the noise samples $\{n_k\}$ are assumed to be independent and identically distributed Gaussian random variables (See E. A. LEE AND D. G. MESSERCHMITT, DIGITAL COMMUNICATIONS (1988)) with variance equal to $\sigma^2$.

Digital amplifier 211 amplifies the output signal $\alpha_k$ from analog-to-digital converter 210 to adjust for the loss of signal resulting from the transmission through transmission channel 201 and pre-filter 207. Equalizer 212 equalizes the amplified version of signal $\alpha_k$ to produce equalized signal $a_k'$ as indicated in FIG. 2A.

Equalizer 212 can be any type of equalizer including a linear equalizer, a decision feedback equalizer, or a sequence detector, alone or in combination. Examples of equalizers applicable to 100 or 1000 BASE-T Ethernet over category-5 wiring, 24 gauge twisted copper pair, are discussed in U.S. patent application Ser. No. 08/974,450, filed Nov. 20, 1997, Raghavan, assigned to the same assignee as the present application, now U.S. Pat. No. 6,083,269, herein incorporated by reference in its entirety; and U.S. patent application Ser. No. 09/020,628, filed Feb. 9, 1998, Raghavan, assigned to the same assignee as the present application, now U.S. Pat. No. 6,115,418, herein incorporated by reference in its entirety.

Further examples of equalization systems are described in U.S. patent application Ser. No. 09/296,086, filed Apr. 21, 1999, Raghavan et al., assigned to the same assignee as the present application, now U.S. Pat. No. 6,418,172 B1, herein incorporated by reference in its entirety; U.S. patent application Ser. No. 09/151,525, filed Sep. 11, 1998, Raghavan, assigned to the same assignee as the present application, now U.S. Pat. No. 6,415,003 B1, herein incorporated by reference in its entirety; U.S. patent application Ser. No. 09/161,346, filed Sep. 25, 1998, Raghavan et al., assigned to the same assignee as the present application, now U.S. Pat. No. 6,438,163 B1, herein incorporated by reference in its entirety; and U.S. patent application Ser. No. 09/560,109, filed Apr. 28, 2000,Sallaway et al., assigned to the same assignee as the present application, now U.S. Pat. No. 7,050,517 B1, herein incorporated by reference in its entirety.

Slicer 213 receives signal stream $\{a_k\}$ from equalizer 212 and, based on that stream $\{a_k\}$, decides on an output symbol stream $\{â_k\}$. The output symbol stream $\{â_k\}$ represents the best estimate of receiver 208 of the symbol stream $\{a_k\}$ that was originally transmitted by transmitter 221.

Receiver 208 may be an adaptive receiver, further including coefficient update 214 that adjusts the coefficient parameters of equalizer 212 in order to optimize the performance of receiver 208. Receiver 208 may also include automatic gain control (AGC) 215 that dynamically adjusts the gain of amplifier 211 in order to maximize the efficiency of receiver 208. Furthermore, clock recovery 216 can provide timing and framing for analog-to-digital converter 210, representing an element of a phase-locked loop.

Figure 5A:
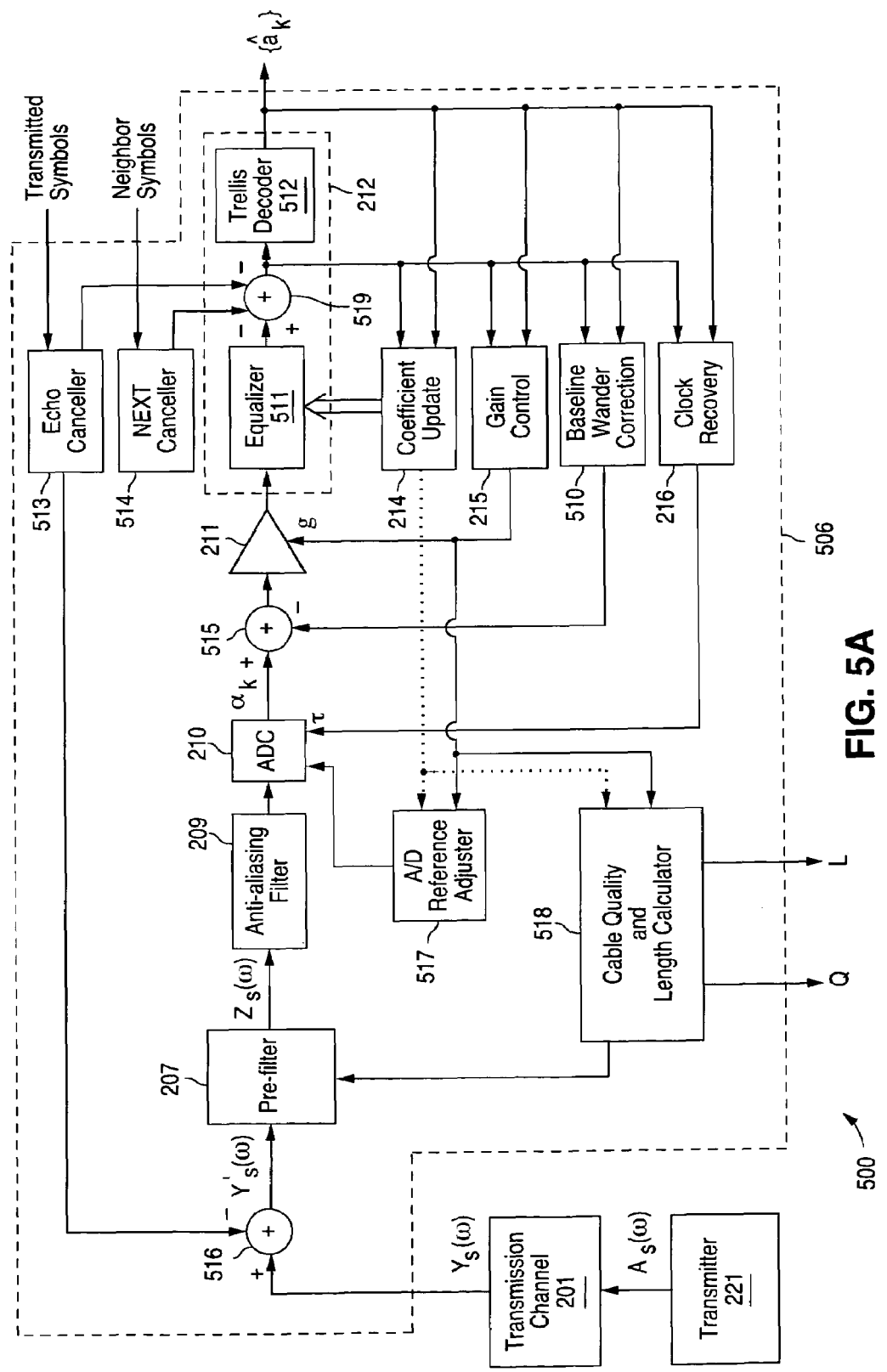
FIG. 5A shows another embodiment of a receiver according to the present invention.

FIG. 5A shows an embodiment of another receiver 506 according to the present invention. Receiver 506 includes pre-filter 207, anti-aliasing filter 209, analog-to-digital converter 210, amplifier 211, and digital equalizer 212. Although digital equalizer 212 can be any equalizer system, as has been previously described, digital equalizer 212 in FIG. 5A is shown as having an equalizer 511 coupled in series with a trellis decoder 512. Equalizer systems are described in U.S. patent applications Ser. Nos. 08/974,450, 09/020,628, 09/161,346, 09/296,086, 09/151,525, and 09/560,109, all cited above, and will not be further discussed here.

Receiver 506 also includes adaptive coefficient update 214 which adaptively chooses the operating parameters of equalizer 511, gain control 215 which adaptively chooses the gain setting of amplifier 211, and clock recovery 216 which forms the phase-locked-loop required to frame the data acquisition by analog-to-digital converter 210.

Receiver 506 can further include a baseline wander correction circuit 510 that, when combined with adder 515, corrects the output signal $\alpha_k$ of analog-to-digital converter 210 for signal wander. Baseline wander correction is further described in U.S. patent application Ser. No. 09/151,525, cited above. Receiver 506 can also include an A/D reference adjuster 517, which adjusts the reference voltage of analog-to digital converter 210 according to the measured apparent length of the cable associated with transmission channel 201.

Receiver 506 can include a cable quality and length calculator 518. As described in U.S. patent application Ser. No. 09/161,346, cited above, cable quality and length calculator 518 calculates the length of cable in transmission channel 201 and the quality of transmission channel 201 based on the gain calculation of gain control 215 or the equalizer coefficients of equalizer 511. Both A/D reference adjuster 517 and cable quality and length calculator 518 are affected by pre-filter 207, which has the effect of simultaneously making transmission channel 201 appear to be of very high quality and to make the cable length of transmission channel 201 appear longer. The apparent quality increases because pre-filter 207 removes some of the interference caused by transmission channel 201. The cable appears longer if there is any loss of signal strength in pre-filter 207. Cable quality and length calculator 518 can, however, adjust for the presence of pre-filter 207 in order to have accurate calculations of cable length and quality.

Receiver 506 can also include an echo canceller 513 and a NEXT canceller 514. NEXT canceller 514 cancels interference on one transmission line based on the transmission of symbols over neighboring lines. Echo canceller 513 cancels interference from symbols transmitted by a transmitter (not shown) associated with receiver 506.

In some transmission systems, signals are transmitted over a cable having multiple wires. Transmission channel 201 and receiver 506 represent detection of the transmitted signal over one of the multiple wires. In that case, signals on neighboring wires affect the transmitted signal on transmission channel 201. NEXT canceller 514 computes the influence of transmitted signal from other pairs of wires at the input of adder 519. The projected influence from symbols transmitted on neighboring lines is subtracted from the digitized symbol by adder 519.

Echo canceller 513 subtracts the influence of symbols that are reflected back into receiver 506 by transmission along a cable associated with transmission channel 201. In most transceiver systems, receiver 506 and a transmitter (not shown) are coupled to a common host. The transmitter transmits signals through transmission channel 201 to a receiver counterpart (not shown) of transmitter 221. Some of that transmitted signal may be reflected back into receiver 506. Echo canceller 513 projects the reflected signal based on the transmitted signals and subtracts the influence of that signal at adder 516 and adder 519.

Figure 5B:
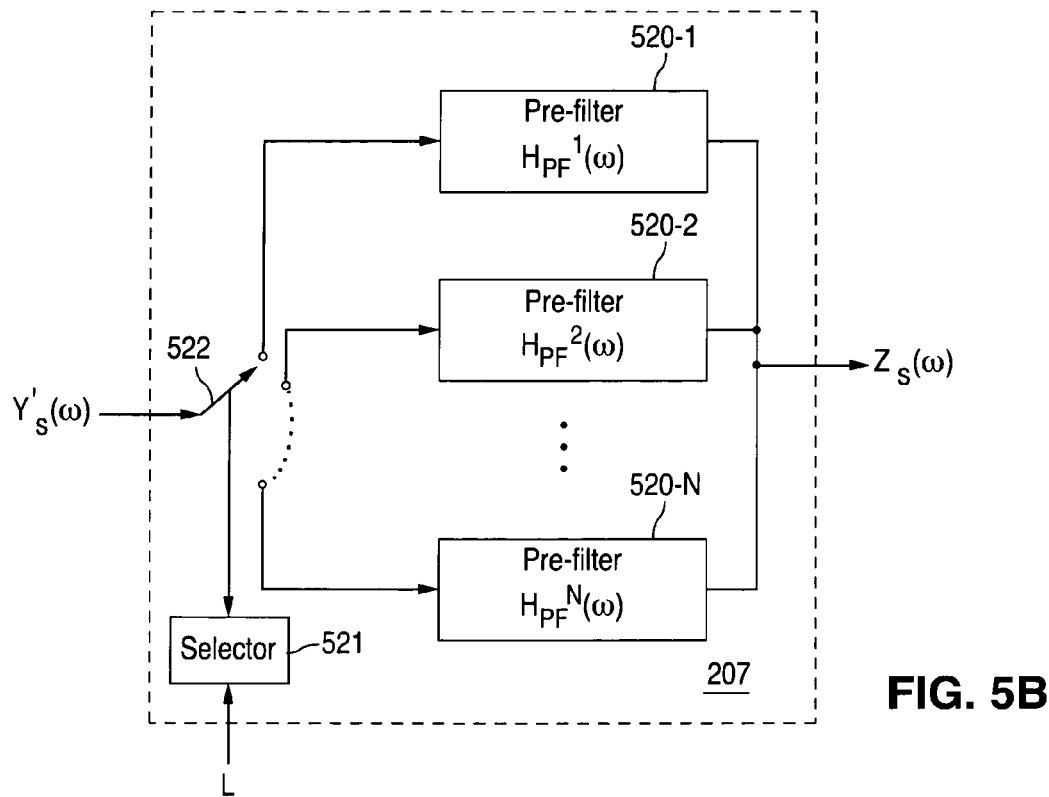
FIGS. 5B and 5C show embodiments of pre-filters for a receiver according to the present invention.

FIG. 5B shows an embodiment of pre-filter 207 that is sensitive to the cable length of transmission channel 201. Pre-filter 207 as shown in FIG. 5B includes pre-filters 520-1 through 520-N. Pre-filters 520-1 through 520-N execute transfer functions $H_{PF}^1(\omega)$ through $H_{PF}^N(\omega)$, respectively. Each of pre-filters 520-1 through 520-N is optimized to counter the interference from a transmission channel having a particular cable length. Each pre-filter 520-$i$ can be designed by minimizing a cost function such as that shown in Equation 10. A selector 521, in response to the cable length L calculated by cable quality and length calculator 518 (FIG. 5A), selects one of pre-filters 520-1 through 520-N. Selector 521 controls a switch 522 which supplies input signal $Y_s(\omega)$ to the selected one of pre-filters 520-1 through 520-N. Therefore, pre-filter 207 can be selected in order to optimize the performance of receiver 506.

Figure 5C:
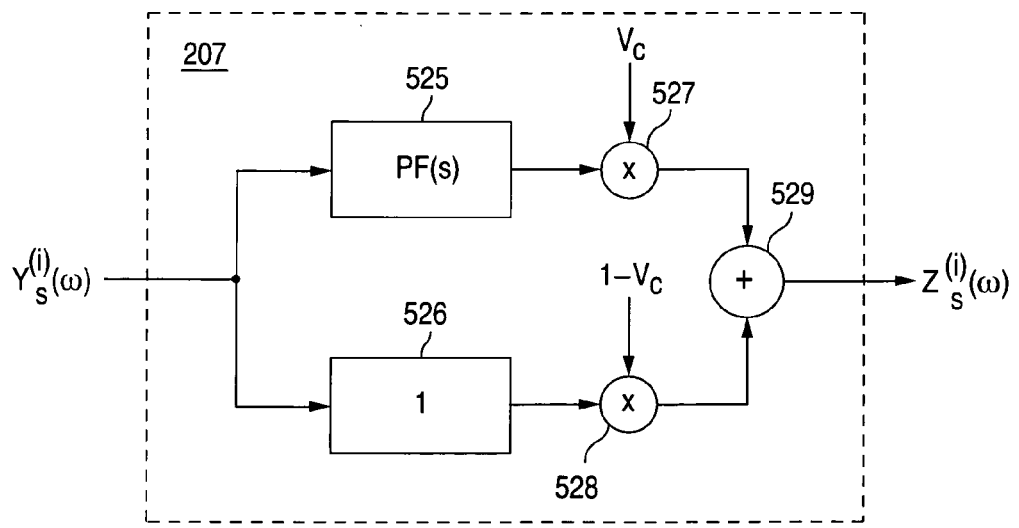

FIG. 5C shows another embodiment of pre-filter 207 according to the present invention. Pre-filter 207 of FIG. 5C executes the adaptively controlled transfer function of Equation 13. Input signal $Y_s(\omega)$ is input to block 525 which executes the transfer function PF(s). Transfer function PF(s) can, for example, be the transfer function of Equation 14. The input signal $Y_s(\omega)$ is also input to block 526 which executes the transfer function one. The output signal from block 525 is multiplied by the adaptively chosen parameter $V_c$ in multiplier 527 and input to adder 529. The output signal from block 526 is multiplied by $1-V_c$ in multiplier 218 and added to the output signal from multiplier 527 by adder 529. The output signal from adder 529 is the output signal $Z_s(\omega)$ from pre-filter 207.

Figure 6A:
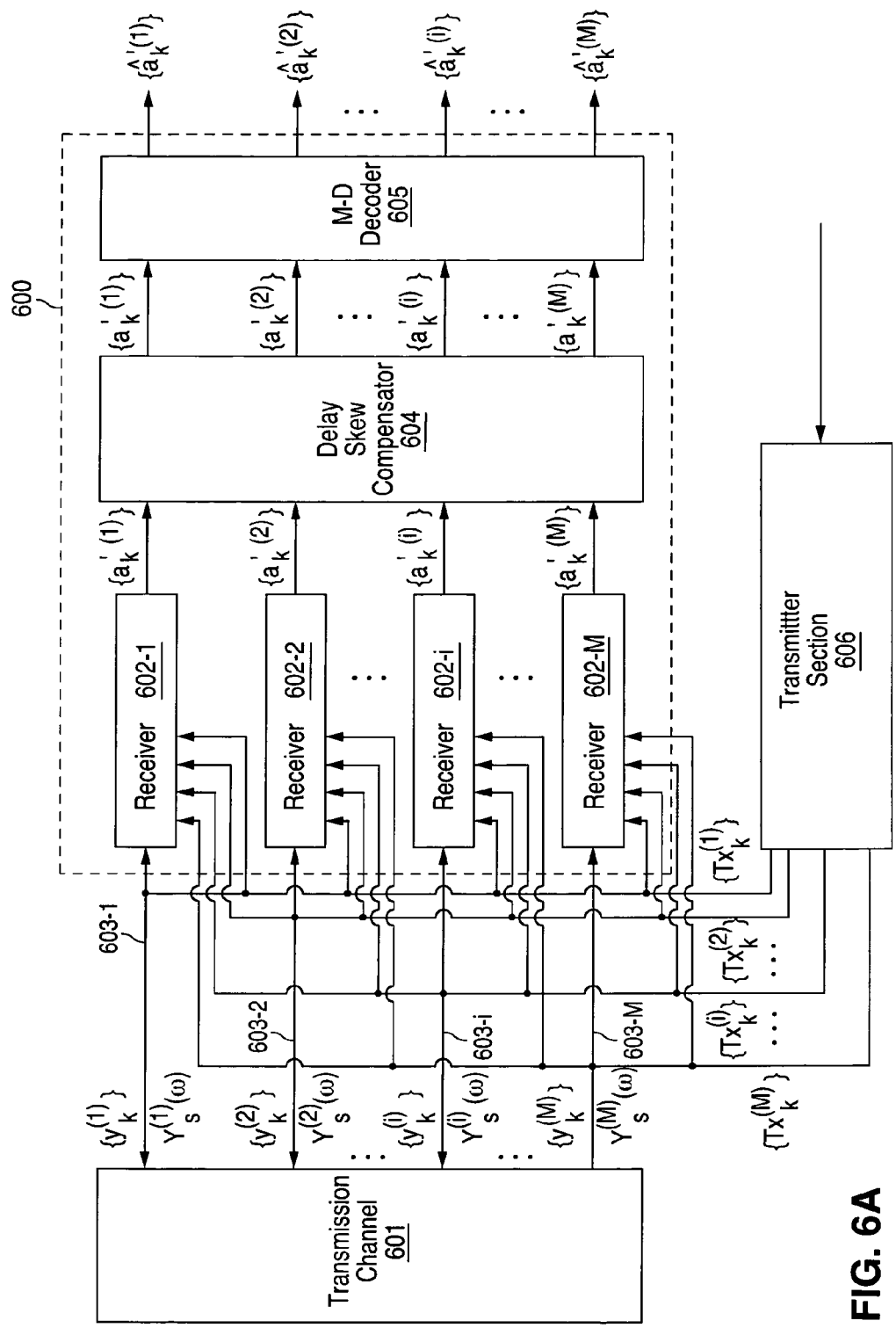
FIGS. 6A, 6B, 6C, 6D and 6E show embodiments of a multi-wire receiver system according to the present invention.
Figures 2, 6B, 6E:
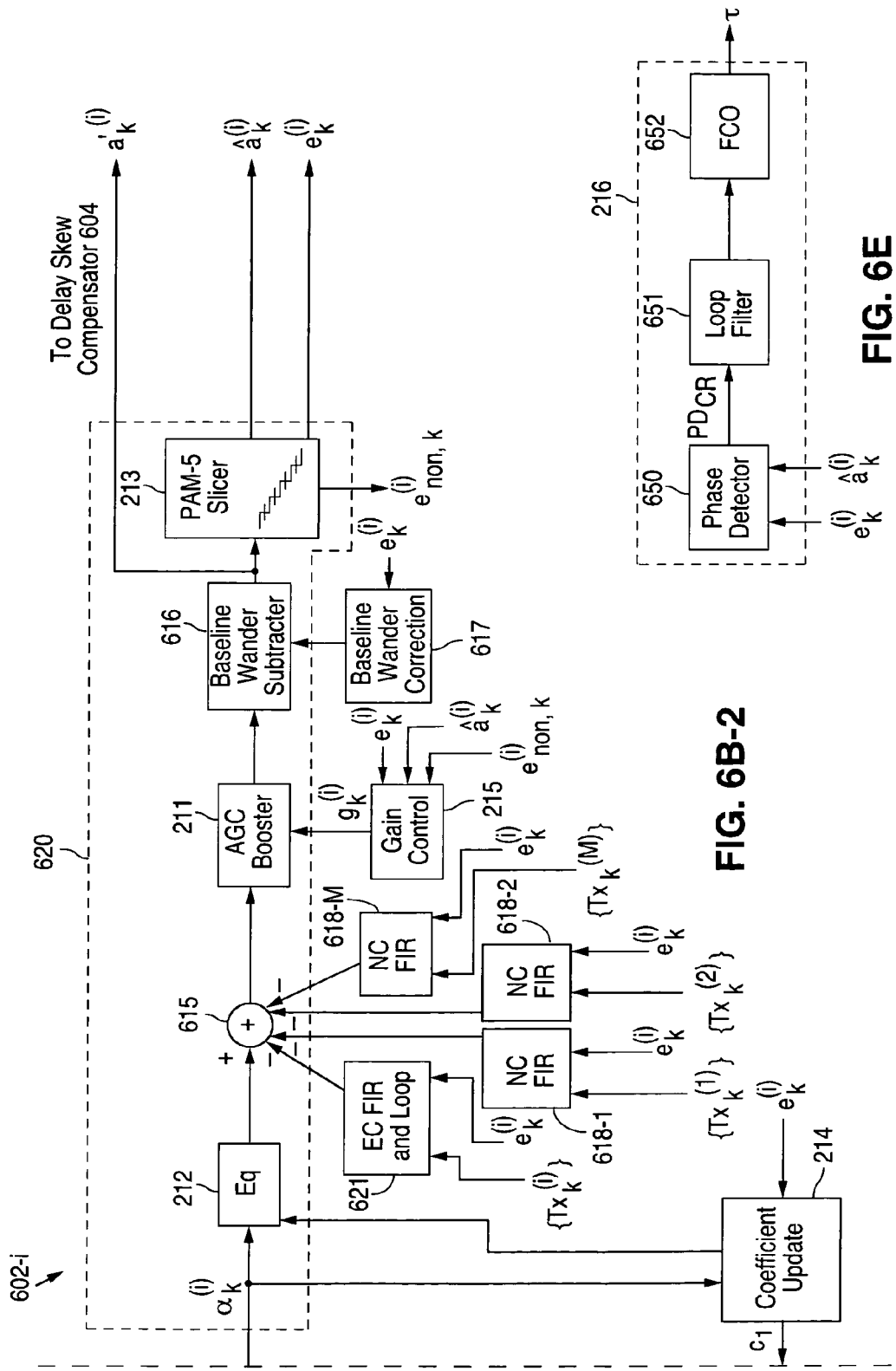

FIG. 6A shows a multi-wire receiver 600 according to the present invention. Transmission receiver 600 receives input analog signal streams $\{y_k^{(1)}\}$ through $\{y_k^{(M)}\}$ from M wires 603-1 through 603-M, respectively. Signal streams $\{y_k^{(1)}\}$ through $\{y_k^{(M)}\}$ are also indicated as input signals $Y_s^{(1)}(\omega)$ through $Y_s^{(M)}(\omega)$, respectively, in FIG. 6A. Each receiver input signal $Y_s^{(i)}(\omega)$ is the Fourier transform of receiver input analog signal $y_k^{(i)}$ for integer i running from 1 to M. Each of input signals, $Y_s^{(1)}(\omega)$ through $Y_s^{(M)}(\omega)$ includes the effects of a transmission channel 601, as described above for transmission channel 201. Additionally, each of signals $Y_s^{(1)}(\omega)$ through $Y_s^{(M)}(\omega)$ includes effects of cross talk between wires so that, for example, signal $Y_s^{(i)}(\omega)$, where the ith wire 603-i is an arbitrary one of wires 603-1 through 603-M, includes a contribution from signals on all of the other wires, i.e., wires 603-1 through 603-(i−1) and wires 603-(i+1) through 603-M.

Individual receivers 602-1 through 602-M receive input signals $Y_s^{(1)}(\omega)$ through $Y_s^{(M)}(\omega)$, respectively, i.e., input analog signal streams $\{y_k^{(1)}\}$ through $\{y_k^{(M)}\}$, respectively, and generate output signal streams $\{a'_k^{(1)}\}$ through $\{a'_k^{(M)}\}$, respectively. In some embodiments, signal streams $\{a'_k^{(1)}\}$ through $\{a'_k^{(M)}\}$ are input to slicers (not shown in FIG. 6A) within receivers 602-1 through 602-M, respectively. The slicers in receivers 602-1 through 602-M determine symbol streams $\{\hat{a}_k^{(1)}\}$ through $\{\hat{a}_k^{(M)}\}$ (also not shown in FIG. 6A), respectively, as discussed below in connection with FIG. 6B for an embodiment of one of receivers 602-1 through 602-M. Symbol streams $\{\hat{a}_k^{(1)}\}$ through $\{\hat{a}_k^{(M)}\}$ here are temporary decisions made in order to control the adaptation of parameters within receivers 602-1 through 602-M, respectively.

An arbitrary receiver 602-i, which is one of receivers 602-1 through 602-M, also inputs the output symbol streams $\{Tx_k^{(1)}\}$ through $\{Tx_k^{(M)}\}$ from a transmitter 606 associated with receiver 600. Each of receivers 602-1 through 602-M can then include echo cancellation and near end crosstalk (NEXT) cancellation due to the transmitted symbols of transmitter 606. As indicated in FIG. 6A, each output symbol stream $\{Tx_k^{(i)}\}$ is also supplied on corresponding wire 603-i to transmission channel 601.

In some embodiments, receiver output signal streams $\{a'_k^{(1)}\}$ through $\{a'_k^{(M)}\}$ are input to a delay skew compensator 604. FIG. 6A depicts such an embodiment. Delay skew compensator 604 provides output signal streams, also denoted as $\{a'_k^{(1)}\}$ through $\{a'_k^{(M)}\}$ here, that are input to a multi-dimensional (M-D) decoder 605 for final decision on the received symbols.

Delay skew compensator 604 aligns the M signal streams $\{a'_k^{(1)}\}$ through $\{a'_k^{(M)}\}$, i.e., compensator 604 aligns signals $a'_k^{(1)}$ through $a'_k^{(M)}$ at each time period (or clock cycle) k, so that any delays between signal streams $\{a'_k^{(1)}\}$ through $\{a'_k^{(M)}\}$ received from receivers 602-1 through 602-M, respectively, are removed. Relative delays between signal streams $\{a'_k^{(1)}\}$ through $\{a'_k^{(M)}\}$ may be introduced in transmission channel 601 or by receivers 602-1 through 602-M. The aligned signals $a'_k^{(1)}$ through $a'_k^{(M)}$ from delay skew compensator 604 for a particular clock cycle k arrive at M-D decoder 605 simultaneously.

Decoder 605, which may be a Viterbi decoder, uses aligned signal streams $\{a'_k^{(1)}\}$ through $\{a'_k^{(M)}\}$ to make a final decision on the incoming data. The final decision of decoder 605 is indicated in FIG. 6A as M output symbol streams $\{\hat{a}'_k^{(1)}\}$ through $\{\hat{a}'_k^{(M)}\}$.

Additionally, decoder 605 may utilize an error detecting code such as that defined in the IEEE standard for Gigabit Ethernet. See, e.g., IEEE 802.3ab, "Gigabit Long Haul Copper Physical Layer Standards Committee", 1997 Standard. In one embodiment, M-D decoder 605 is a Viterbit decoder which makes a final decision on data which has been encoded by an 8-state Ungerboeck code, as described in the IEEE Gigabit Spec. The Viterbi decoder in this embodiment is a maximum likelihood sequence estimator, as described in Viterbi, A. J., "Error Bounds for Convolutional Codes and an Asymptotically Optimum Decoding Algorithm," IEEE Trans. Inf. Theory, IT-13, pages 260-269, April 1967, herein incorporated by reference in its entirety. M-D decoder 605, therefore, maximizes the probability of correctly estimating the entire sequence of symbols.

FIG. 6B shows an embodiment of a receiver 602-i that includes an analog prefilter 619 and a digital filter 620. Analog prefilter 619 includes a DC offset adder 610 coupled to a DC offset correction circuit 628, an echo canceller adder 611 coupled to an analog echo canceller circuit 627, an analog multiplier 612 coupled to analog automatic gain control circuit 220, and analog equalizers 613 and 614 coupled to analog equalizer adaptor circuit (phase detector) 217. Digital filter 620 includes digital equalizer 212, a digital echo/NEXT canceller adder 615 coupled to a digital echo canceller 621 and to NEXT cancellers 618-1 through 618-M without a canceller 618-i, AGC booster (digital amplifier) 211 coupled to digital automatic gain control circuit 215, a baseline wander subtracter (or adder) 616 coupled to a baseline wander correction circuit 617, and slicer 213. Analog portion 619 is coupled to digital portion 620 through analog-to-digital converter 210. For exemplary purposes, slicer 213 is shown as a PAM-5 decoder. Timing recovery loop (clock recovery) 216 controls a clock used in both the analog and digital portions of receiver 602-i and calculates the timing phase parameter $\tau_k^{(i)}$.

Slicer 213 provides (a) a temporary decision $\hat{a}_k^{(i)}$ on the kth symbol $a_k^{(i)}$ intended to be transmitted in signal stream $\{y_k^{(i)}\}$ on wire 603-i and (b) an error $e_k^{(i)}$ based on input signal $a'_k^{(i)}$, where error $e_k^{(i)}$ is defined as $$e_k^{(i)} = a'_k^{(i)} - \hat{a}_k^{(i)}. \quad (25)$$

The temporary decision $\hat{a}_k^{(i)}$ and error $e_k^{(i)}$ are utilized in various circuit loops in receiver 602-i in order to adapt parameters in receiver 602-i. As discussed below and indicated in FIG. 6B, temporary decision $\hat{a}_k^{(i)}$ and error $e_k^{(i)}$ are also utilized to adapt parameters in analog prefilter 619.

DC offset correction circuit 628 includes an ADCO control 633 coupled to a digital-to-analog converter (DAC) 634. DAC 634 provides a signal which is negatively added to the received signal $Y_s^{(i)}(\omega)$ in DC offset adder 610. ADCO control 633 inputs the output signal $\alpha_k^{(i)}$ from ADC 210 and estimates the DC offset that occurs in analog prefilter 619. This calculated DC offset, upon being converted from digital to analog form by DAC 634, is then subtracted from the input signal $Y_s^{(i)}(\omega)$ in adder 610.

Analog echo canceller circuit 627 includes an AEC control 629, DACs 630 and 631, and an RC circuit 632. AEC control 629 inputs the error signal $e_k^{(i)}$ as well as the transmitted symbol stream $\{Tx_k^{(i)}\}$ on wire 603-i (FIG. 6A) and adapts the resistance $R_k^{(i)}$ and capacitance $C_k^{(i)}$ in RC circuit 632. Transmit signal $Tx_k^{(i)}$ is filtered in RC circuit 632. Echo adder 611 subtracts the resultant filtered signal from input signal $Y_s^{(i)}(\omega)$ minus the DC offset determined by DC offset correction circuit 628. The parameters $R_k^{(i)}$ and $C_k^{(i)}$ are adapted to approximately duplicate the effects of the transmit signal $Tx_k^{(i)}$ on the signal input to adder 611. Appropriate values for $R_k^{(i)}$ and $C_k^{(i)}$ minimizes the residual echo from the transmit signal $Tx_k^{(i)}$, which results in minimizing the requirements of digital echo canceller circuit 621. Furthermore, by minimizing the residual echo, analog AGC 220 can provide for maximum boost to input signal $Y_s^{(i)}(\omega)$ through multiplier 612 without overloading ADC 210, which results in clipping. The additional boost at multiplier 612 results in a lessened need for amplification at digital AGC boost 211, thereby minimizing quantization noise.

Figure 6C:
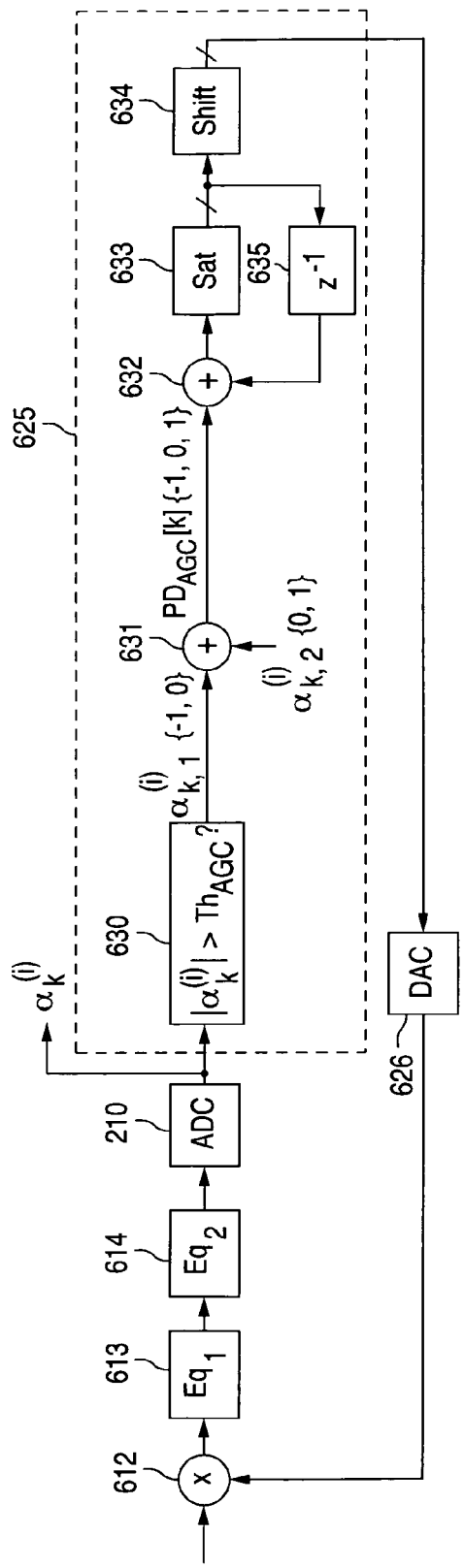
Figure 6D:
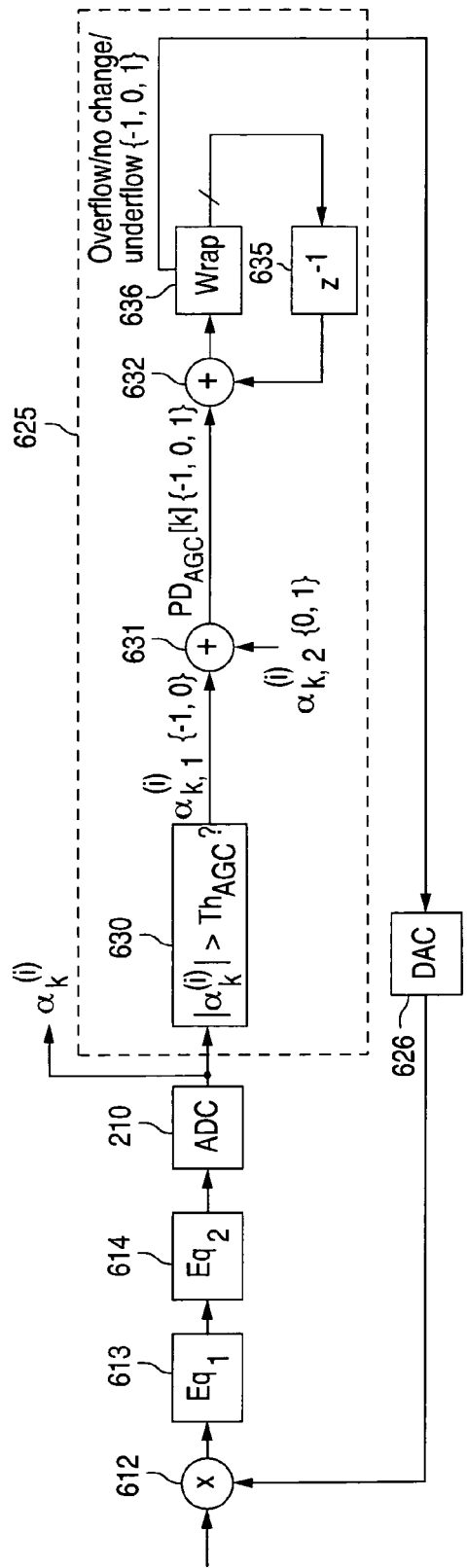

Analogous to what occurs in receiver 206 of FIG. 2A, analog gain control circuit 220 outputs a gain signal to multiplier 612 that adjusts the output levels of prefilter 619 to optimize the functionality of ADC 210. Analog gain control circuit 220 contains AGC control circuit 625 and DAC 626. FIGS. 6C and 6D show embodiments of analog gain control circuit 220, specifically embodiments of AGC control circuit 625.

One embodiment of AGC control circuit 625 is shown in FIG. 6C. Test block 630 compares signal $\alpha_k^{(i)}$ with threshold $Th_{AGC}$ and calculates, for each receiver 602-*i*, value $\alpha_{k,1}$ according to Equation 20. The value $\alpha_{k,2}$ is calculated according to Equation 21. The value of $PD_{AGC}$ is calculated according to Equation 19 in adder 631. The value of $PD_{AGC}$ is input to an adder 632. The output signal of adder 632 goes to saturation block 633. Saturation block 633 saturates at, for example, 13 bits. The output from saturation block 633 is delayed one clock cycle and added to $PD_{AGC}$ at adder 632. The combination of adder 632, saturation block 633, and delay 635 forms an accumulator.

The output signal of saturation block 633 is right shifted by a particular number of bits, for example, 7 bits, in shifter 634 to give an output signal of a particular number of bits, for example, 6 bits. The output signal from shifter 634 provides an input signal to DAC 626. Multiplier 612 multiplies the analog output signal from DAC 626, which is the output signal from analog AGC control circuit 220 (FIG. 6B), by the input signal $Y_s^{(i)}(\omega)$ as modified by the subtractions at adders 610 and 611.

Because of the low frequency nature, the input signal to DAC 626 of AGC 220 has very small variations from sample to sample. In most cases, the variation is at most one count. FIG. 6D shows an embodiment of analog AGC control circuit 220 (AGC control 625 and DAC 626) that takes advantage of this feature. Instead of a "general purpose" 6 bit D/A, a less expensive Sigma-Delta D/A is used for DAC 626 in the embodiment of FIG. 6D. In that case, saturation block 633 is replaced with a smaller block 636 of size, for example, 7 bits. The accumulated value, i.e., the output signal from the accumulator formed by adder 632, block 636 and delay 635, is wrapped around (modulo) to a particular number of bits, for example 7 bits.

The output of block 636 is a three-level signal representing overflow, no change, or underflow of the accumulation value. The three-level signal is the output signal received by DAC 626 implemented as a Sigma-Delta DAC. DAC 626 then outputs an analog value which multiplier 612 multiplies by the input signal $Y_s^{(i)}(\omega)$ again as modified by the subtractions at adders 610 and 611.

In the embodiment shown in FIG. 6B, the analog equalization is accomplished by analog equalizer 613 cascaded with analog equalizer 614. Each of analog equalizer 613 and analog equalizer 614 is controlled by analog equalizer control circuit (phase detector) 217. Analog equalizer control circuit 217 includes AEQ control 622 coupled to DAC 623, which is coupled to control analog equalizer 613, and coupled to DAC 624, which is coupled to control analog equalizer 614. Analog equalizers 613 and 614 accomplish partial equalization of the input signal $Y_s^{(i)}(\omega)$, resulting in a lessened requirement for digital equalization. Analog equalizers 613 and 614 and analog equalization control circuit 217 operate as is described above in connection with Equations 14 through 18.

Analog-to-digital converter 210 receives the output signal $Z_s^{(i)}(\omega)$ from analog prefilter 619 and digitizes the signal. The output from ADC 210 is signal $\alpha_k^{(i)}$.

ADC 210 samples input signal $Z_s^{(i)}(\omega)$ based upon the clock output from timing recovery loop (clock recovery) 216 and phase $\tau_k^{(i)}$. Clock recovery 216 recovers the frequency of the received signal (i.e., the frequency of transmitter 221 (FIG. 2)) and finds the optimal value $\tau$ of the timing phase $\tau_k^{(i)}$ of the incoming signal. For a constant clock frequency offset between the remote transmitter's digital-to-analog converter and ADC 210, the optimal timing phase $\tau$ varies linearly with time. The rate of change of phase $\tau_k^{(i)}$ is proportional to the clock frequency offset.

Clock recovery 216 can be a second order loop. One embodiment of clock recovery 216 is shown in FIG. 6E. A phase detector 650 estimates the difference between the optimal phase $\tau$ and the current value of $\tau_k^{(i)}$ based on the output symbol $\hat{a}_k^{(i)}$ and the error calculation $e_k^{(i)}$. The output signal $PD_{CR}$ from phase detector 650 for receiver 602-*i* can be determined in several manners, including a slope method and a Mueller & Muller (M&M) method. In the M&M method, the output signal $PD_{CR}$ from phase detector 650 is $$PD_{CR}=e_{k-1}^{i}\hat{a}_k^{(i)}-e_k^{(i)}\hat{a}_{k-1}^{(i)}. \tag{26}$$

In the slope method, $$PD_{CR}=e_k^{(i)}\text{slope}(k), \tag{27}$$

where $$\text{slope}(k) = \begin{pmatrix} 1 & \text{if } \hat{a}_{k-1}^{(i)} < \hat{a}_k^{(i)} < \hat{a}_{k+1}^{(i)} \\ -1 & \text{if } \hat{a}_{k-1}^{(i)} > \hat{a}_k^{(i)} > \hat{a}_{k+1}^{(i)} \\ 0 & \text{otherwise} \end{pmatrix}. \tag{28}$$

The output signal $PD_{CR}$ from the phase detector 650 is input to a loop filter 651 that has a proportional part and an integral part. The output signal from loop filter 651, indicating the correction on the clock frequency, is input to a frequency controlled oscillator 652 which causes ADC 210 to sample at an optimal phase by controlling the sampling frequency of ADC 210. Frequency controlled oscillator 652, in other words, outputs a clock signal whose zero-crossings are given by $NT+\tau_k^{(i)}$.

If the coefficient $c_{-1}$ of digital equalizer 212 is adapted, the adaptation algorithms between coefficient update 214 and clock recovery 216 will interact adversely, often causing failure of receiver 600. To prevent this interaction, coefficient $c_{-1}$ is fixed, for example, at −1/8, in order that the timing loop can converge to an optimum phase.

Since part of the equalization is accomplished in analog equalizers 613 and 614, digital equalizer 212 can be simplified. For example, digital equalizer 212 can be a linear equalizer without causing large amounts of noise enhancement. Of course, as has been previously discussed, other embodiments of digital equalizer 212 can use any equalization scheme.

High frequency signals are attenuated more by transmission channel 601 than are low frequency signals. The equalization, between analog equalizers 613 and 614 and digital equalizer 212, then should equalize the attenuation difference across the frequency band.

In one embodiment, digital equalizer 212 in each receiver 602-*i* is a linear equalizer executing the transfer function $H_{EQ}^{(i)}(z)$ given as $$H_{EQ}^{(i)}(z)=c_{k,-1}^{(i)}z+c_{k,0}^{(i)}+c_{k,1}^{(i)}z^{-1}+\ldots+c_{k,K}^{(i)}z^{-k}. \tag{29}$$

The parameter K can be any positive integer, for example, 1 in some embodiments. The coefficient $c_{k,-1}^{(i)}$ can be fixed, for example, at −1/8, to avoid interaction with the adaptation performed by timing recovery loop 216. Further, the coefficient $c_{k,0}^{(i)}$ can be fixed, for example, at 1, to avoid interaction with digital AGC 215. The remaining equalizer coefficients $c_{k,1}{}^{(i)}$ through $c_{k,K}{}^{(i)}$ are adaptively chosen by coefficient update 214. Equalizer transfer function $H_{EQ}{}^{(i)}(z)$ of Equation 29 corresponds to equalizer transfer function $H_{EQ}(z)$ of Equation 17 with each coefficient $c_{k,j}{}^{(i)}$ of Equation 29 replacing corresponding coefficient $c_j$ of Equation 17.

Coefficient update 214 can use a least mean squares (LMS) technique to continuously adjust the equalizer coefficients $c_{k,j}{}^{(i)}$ such that $$c_{k+1,j}{}^{(i)} = c_{k,j}{}^{(i)} - \mu_{EQ,j}{}^{(i)} \text{sign}(\alpha_{k-j}{}^{(i)}) e_k{}^{(i)}. \tag{30}$$

The LMS technique minimizes the mean squared error, which is a function of intersymbol interference and random noise, of the input signal at slicer 213. The parameter $\mu_{EQ,j}{}^{(i)}$ controls the rate at which the coefficient $c_{k,j}{}^{(i)}$ changes. In some embodiments, the parameter $\mu_{EQ,j}{}^{(i)}$ is set to about $10^{-3}$ on chip powerup and reduced to about $10^{-5}$ for continuous operation.

After equalization with digital equalizer 212, digital echo canceller 621 removes the residual echo due to transmitter 606 transmitting on wire 603-$i$ which is left by analog echo canceller circuit 627. The M-1 NEXT cancellers 618-1 through 618-M remove the near end crosstalk from transmitter 606 on wires 603-1 through 603-M, respectively, other than wire 603-$i$. In a four-wire system (M=4), there are three NEXT cancellers 618-1 through 618-M except for 618-$i$ and one echo canceller 621 for signals transmitted on wire 603-$i$.

Digital echo canceller 621 cancels the residual echo not cancelled by analog echo canceller circuit 627. The bulk of the echo cancellation is accomplished by analog echo canceller circuit 627. Removing the residual echo by digital echo canceller 621 is necessary to achieve the bit-error rate (BER) performance of receiver 602-$i$.

In one embodiment, echo canceller 621 uses a finite-impulse response (FIR) filter to estimate the residual echo on the channel. FIR echo canceller 621 executes a transfer function $EC_k{}^{(i)}$ given by $$EC_k^{(i)} = \sum_{j=0}^{L} \varsigma_{k,j}^{(i)} z^{-j}, \tag{31}$$

where L is an integer, for example, 64 or 56. Echo canceller 621 inputs the transmitted symbol stream $\{Tx_k{}^{(i)}\}$ and estimates the residual echo at that point in the data path, including the impulse response of the residual echo channel after analog echo canceller 627, analog AGC 625, analog equalizers 613 and 614, and digital equalizer 212.

Each of the coefficients $\varsigma_{k,j}{}^{(i)}$ in Equation 31 is chosen by an adaptation loop using a least mean squares technique such that $$\varsigma_{k+1,j}{}^{(i)} = \varsigma_{k,j}{}^{(i)} - \mu_{EC,j}{}^{(i)} \text{sign}(Tx_{k-j}{}^{(i)}) e_k{}^{(i)}. \tag{32}$$

The coefficients $\varsigma_{k,j}{}^{(i)}$ are continuously adjusted to maintain the minimum mean squared error at slicer 213. The parameter $\mu_{EC,j}{}^{(i)}$ may initially be set high (e.g., $10^{-3}$) and then lowered (e.g., $10^{-5}$) for continuous operation.

As mentioned above, the M-1 NEXT cancellers 618-1 through 618-M in receiver 602-$i$ cancel the near end crosstalk which is a result of transmitter 606 transmitting on wires 603-1 through 603-M other than wire 603-$i$. Note that there is no NEXT canceller (618-$i$) for receiver 602-$i$ because the effects of transmitting symbols on wire 603-$i$ are cancelled by analog echo canceller 627 and digital echo canceller 621. Each of the M-1 NEXT cancellers 618-1 through 618-M estimates the impulse response from the NEXT in an FIR block. The impulse response that is used to estimate the NEXT at this point in the data path is the impulse response of the NEXT contribution in transmission channel 601 that has been added to the receive signal filtered by analog prefilter 619 and digital equalizer 212. Each of the M-1 NEXT cancellers 618-1 through 618-M executes a transfer function $NE_{p,k}{}^{(i)}$ given by $$NE_{p,k}^{(i)} = \sum_{j=0}^{L} \xi_{p,k,j}^{(i)} z^{-j}, \tag{33}$$

where p denotes a channel that is not channel $i$ and L can be any positive integer, for example, 44 or 16.

Each of the coefficients $\xi_{p,k,j}{}^{(i)}$ is adaptively chosen according to a least mean squares technique such that $$\xi_{p,k+1,j}{}^{(i)} = \xi_{p,k,j}{}^{(i)} + \mu_{NE,p,j}{}^{(i)} \text{sign}(Tx_{k-j}{}^{(p)}) e_k{}^{(i)}. \tag{34}$$

The coefficients $\xi_{p,k,j}{}^{(i)}$ are continuously updated to maintain the minimum mean squared error at slicer 213. The parameter $\mu_{NE,p,j}{}^{(i)}$ may initially be set high (e.g., $\sim 10^{-3}$) and then lowered (e.g., $\sim 10^{-5}$) for steady state operation.

The echo and NEXT estimations performed by echo canceller 621 and the M-1 NEXT cancellers 618-1 through 618-M are subtracted from the output signal of equalizer 212 by adder 615.

Digital AGC 215 inputs a gain signal $g_k{}^{(i)}$ to AGC booster 211 which digitally amplifies the output signal from adder 615. The signal is boosted by AGC booster 211 to levels determined by slicer 213. The gain $g_k{}^{(i)}$ is set to counter the losses resulting from transmission channel 601 and not recovered in analog prefilter 619. During acquisition, the gain $g_k{}^{(i)}$ can be updated by the equation $$g_{k+1}{}^{(i)} = g_k{}^{(i)} - \mu_{AGC}{}^{(i)} (e_{non,k}{}^{(i)}), \tag{35}$$

with error $e_{non,k}{}^{(i)}$ determined from $$e_{non,k}{}^{(i)} = |a'_k{}^{(i)}| - Th_{AGC}{}^{(i)}. \tag{36}$$

where $Th_{AGC}{}^{(i)}$ is the average absolute value of $a'_k{}^{(i)}$. The parameter $\mu_{AGC}{}^{(i)}$ can initially be set high and then lowered during steady state operation. During steady state operation, a least mean squares approach can be taken, in which case $$g_{k+1}{}^{(i)} = g_k{}^{(i)} - \mu_{AGC}{}^{(i)} \text{sign}(\hat{a}_k{}^{(i)}) e_k{}^{(i)}. \tag{37}$$

Finally, baseline wander correction circuit 617, in combination with baseline wander subtracter 616, corrects for baseline wander. A discussion of baseline wander can be found in U.S. patent application Ser. No. 09/151,525, cited above.

One skilled in the art will recognize that the components of receiver 506 may be arranged differently. For example, in FIG. 6B amplifier 211 follows equalizer 212 while in FIG. 2A equalizer 212 follows amplifier 211. One skilled in the art will also recognize that receivers according to the present invention may not have some of the features shown in FIGS. 2A, 5A, and 6B or, alternatively, may have other features not shown in FIGS. 2A, 5A, and 6B. FIGS. 2A, 5A, and 6B, therefore, are not exhaustive of all configurations of receivers that are nonetheless within the scope of this disclosure.

The above examples, therefore, are demonstrative only. One skilled in the art can recognize variations which fall within the scope of this invention. As such, the invention is limited only by the following claims.

We claim:

1. A receiver system comprising:
an analog pre-filter for analog filtering a symbol-information-carrying input analog signal, or a first intermediate analog signal generated from the input analog signal, to produce a filtered analog signal with reduced intersymbol interference;
an analog-to-digital converter for converting the filtered analog signal, or a second intermediate analog signal generated from the filtered analog signal, into an initial digital signal;
an equalizer comprising digital equalization circuitry that operates according to a transfer function $H_{EQ}(z)$ for equalizing the initial digital signal, or an intermediate digital signal generated from the initial digital signal, to produce an equalized digital signal as a stream of equalized digital values, transfer function $H_{EQ}(z)$ being given as:

$$H_{EQ}(z) = c_{-1}z + c_0 + \sum_{i=1}^{M} c_i z^{-i}$$

where z is a time-related variable, i is a running integer, $c_i$ is an ith coefficient, M is a fixed integer greater than or equal to 1 whereby at least coefficients $c_{-1}$, $c_0$, and $c_1$ differ from zero, coefficients $c_{-1}$ and $c_0$ are fixed, and each coefficient $c_i$ is adaptively chosen for each value of integer i greater than or equal to 1; and
and output decoder for converting the equalized digital values, or intermediate digital values generated from the equalized digital values, into a stream of symbols.

2. A receiver system as in claim 1 wherein coefficient $c_0$ is approximately 1.

3. A receiver system as in claim 1 wherein integer M is also 1 whereby transfer function $H_{EQ}(z)$ is given as:

$$H_{EQ}(z) = c_{-1}z + c_0 + c_1 z^{-1}.$$

4. A receiver system as in claim 1 wherein coefficient $c_1$ is of opposite numerical sign to coefficient $c_0$.

5. A receiver system as in claim 4 wherein coefficient $c_1$ is varied adaptively so as to be no less than approximately −1.0 and no more than approximately −0.35, coefficient $c_0$ being positive.

6. A receiver system as in claim 4 wherein coefficient $c_{-1}$ is of opposite numerical sign to coefficient $c_0$.

7. A receiver system as in claim 1 further including adaptation control circuitry for adaptively adjusting at least one coefficient $c_i$ for integer i greater than or equal to 1 in response to information provided by operating on the equalized digital values or on further digital values generated from the equalized digital values.

8. A receiver system as in claim 7 wherein the information provided by operating on the equalized or further digital values comprises error information indicative of how much the equalized or further digital values differ from decoded information generated by decoding the equalized or further digital values.

9. A receiver system as in claim 8 wherein the decoded information generated by decoding the equalized or further digital values and used in generating the error information is generated along a different signal processing path than the stream of symbols.

10. A receiver system as in claim 9 further including an additional decoder for generating the decoded information and the error information.

11. A receiver system as in claim 10 wherein the additional decoder comprises a slicer.

12. A receiver system as in claim 7 wherein the further digital values largely constitute the intermediate digital values.

13. A receiver system as in claim 1 wherein the analog pre-filter operates according to an adaptively variable transfer function in reducing intersymbol interference.

14. A receiver system as in claim 13 further including adaptation control circuitry for adaptively adjusting the transfer function of the analog pre-filter in response to information provided by operating on the equalized digital values or on further digital values generated from the equalized digital values.

15. A receiver system as in claim 14 wherein the information provided by operating on the equalized or further digital values comprises error information indicative of how much the equalized or further digital values differ from decoded information generated by decoding the equalized or further digital values.

16. A receiver system as in claim 15 wherein the decoded information generated by decoding the equalized or further digital values and used in generating the error information is generated along a different signal processing path than the stream of symbols.

17. A receiver system as in claim 14 wherein the adaptation control circuitry also adaptively adjusts at least one coefficient $c_i$ for integer i greater than or equal to 1 in response to the information provided by operating on the equalized or further digital values.

18. A receiver system as in claim 1 further including an echo canceller for causing the equalized or/and intermediate digital values to be produced with reduced effects of echo in the input analog signal.

19. A receiver system as in claim 18 wherein the echo canceller performs the echo reduction at least partially adaptively.

20. A receiver system as in claim 18 wherein the echo canceller performs analog echo reduction on at least one of (a) the input analog signal, (b) a third intermediate analog signal generated from the input analog signal, (c) the filtered analog signal, and (d) a fourth intermediate analog signal generated from the filtered analog signal.

21. A receiver system as in claim 20 wherein the echo canceller performs the analog echo reduction at least partially adaptively.

22. A receiver system as in claim 20 wherein the echo canceller also performs digital echo reduction on at least one of (a) the initial digital signal, (b) a further intermediate digital signal generated from the initial digital signal, (c) the equalized digital values, and (d) further digital values generated from the equalized digital values.

23. A receiver system as in claim 22 wherein the echo canceller performs the analog and digital echo reductions at least partially adaptively.

24. A receiver system as in claim 18 wherein the echo canceller operates in response to error information indicative of how much the equalized digital values or further digital values generated from the equalized digital values differ from decoded information generated by decoding the equalized or further digital values.

25. A receiver system as in claim 24 wherein the decoded information generated by decoding the equalized or further digital values and used in generating the error information is generated along a different signal processing path than the stream of symbols.

26. A receiver system as in claim 1 further including a crosstalk canceller for causing the equalized or/and intermediate digital values to be produced with reduced effects of crosstalk in the input analog signal.

27. A receiver system as in claim 26 wherein the crosstalk canceller performs the crosstalk reduction at least partially adaptively.

28. A method comprising:
analog filtering a symbol-information-carrying input analog signal, or a first intermediate analog signal generated from the input analog signal, to produce a filtered analog signal with reduced intersymbol interference;
converting the filtered analog signal, or a second intermediate analog signal generated from the filtered analog signal, into an initial digital signal;
equalizing the initial digital signal, or an intermediate digital signal generated from the initial digital signal, according to a transfer function $H_{EQ}(z)$ to produce an equalized digital signal as a stream of equalized digital values where transfer function $H_{EQ}(z)$ is given as:

$$H_{EQ}(z) = c_{-1}z + c_0 + \sum_{i=1}^{M} c_i z^{-i}$$

where z is a time-related variable, i is a running integer, $c_i$ is an ith coefficient, M is a fixed integer greater than or equal to 1 whereby at least coefficients $c_{-1}$, $c_0$, and $c_1$ differ from zero, and coefficients $c_{-1}$ and $c_0$ are fixed;
adaptively choosing each coefficient $c_i$ for each value of integer i greater than or equal to 1; and
decoding the equalized digital values, or intermediate digital values generated from the equalized digital values, to produce a stream of symbols.

29. A method as in claim 26 wherein coefficient $c_0$ is approximately 1.

30. A method as in claim 26 wherein integer M is also 1 whereby transfer function $H_{EQ}(z)$ is given as:

$$H_{EQ}(z) = c_{-1}z + c_0 + c_1 z^{-1}.$$

31. A method as in claim 26 wherein coefficient $c_1$ is of opposite numerical sign to coefficient $c_0$.

32. A method as in claim 26 wherein the adaptively choosing act includes adaptively adjusting at least one coefficient $c_i$ for integer i greater than or equal to 1 in response to information provided by operating on the equalized digital values or on further digital values generated from the equalized digital values.

33. A method as in claim 32 wherein the information provided by operating on the equalized or further digital values comprises error information indicative of how much the equalized or further digital values differ from decoded information generated by decoding the equalized or further digital values.

34. A method as in claim 33 further including generating the decoded information generated by decoding the equalized or further digital values and used in generating the error information along a different signal processing path than the stream of symbols.

35. A method as in claim 32 wherein the further digital values largely constitute the intermediate digital values.

36. A method as in claim 28 wherein the analog filtering act includes operating according to an adaptively variable transfer function in reducing intersymbol interference.

37. A method as in claim 36 wherein the analog filtering act further includes adaptively adjusting the transfer function of the analog filtering act in response to information provided by operating on the equalized digital values or on further digital values generated from the equalized digital values.

38. A method as in claim 37 wherein the information provided by operating on the equalized or further digital values comprises error information indicative of how much the equalized or further digital values differ from decoded information generated by decoding the equalized or further digital values.

39. A method as in claim 38 further including generating the decoded information generated by decoding the equalized or further digital values and used in generating the error information along a different signal processing path than the stream of symbols.

40. A method as in claim 37 wherein the adaptively choosing act includes adaptively adjusting at least one coefficient $c_i$ for integer i greater than or equal to 1 in response to information provided by operating on the equalized or further digital values.

41. A method as in claim 28 wherein the analog filtering act includes adaptively providing echo cancellation.

42. A method as in claim 41 further including adaptively operating on the initial digital signal, on the equalized digital signal, or on an additional intermediate digital signal generated from the initial or equalized digital signal to provide echo cancellation.

43. A method as in claim 42 wherein the provision of echo cancellation includes operating in response to error information indicative of how much the equalized digital values or further digital values generated from the equalized digital values differ from decoded information generated by decoding the equalized or further digital values.

44. A method as in claim 43 further including generating the decoded information generated by decoding the equalized or further digital values and used in generating the error information along a different signal processing path than the stream of symbols.

45. A receiver system comprising:
at least two receivers, each comprising:
(a) an analog pre-filter for analog filtering a symbol-information-carrying input analog signal to that receiver, or a first intermediate analog signal generated from the input analog signal to that receiver, to produce a filtered analog signal with reduced intersymbol interference;
(b) an analog-to-digital converter to converting the filtered analog signal, or a second intermediate analog signal generated from the filtered analog signal, into an initial digital signal; and
(c) an equalizer comprising digital equalization circuitry that operates according to a transfer function $H_{EQ}(z)$ for equalizing the initial digital signal, or an intermediate digital signal generated from the initial digital signal, to produce an equalized digital signal as a stream of equalized digital values of that receiver, transfer function $H_{EQ}(z)$ being given as:

$$H_{EQ}(z) = \sum_{i=-N}^{M} c_i z^{-i}$$

where z is a time-related variable, i is a running integer, $c_i$ is an ith coefficient, and each of M and N is a fixed integer greater than or equal to 1 whereby at least coefficients $c_{-1}$, $c_0$, and $c_1$ differ from zero; and an output decoder (i) for converting the equalized digital values of each receiver, or intermediate digital values generated from the equalized digital values of each receiver, into a stream of symbols of that receiver and (ii) for correcting errors in the streams of symbols.

46. A receiver system as in claim 45 wherein integer N of each receiver is 1 whereby that receiver's transfer function $H_{EQ}(z)$ is given as:

$$H_{EQ}(z) = c_{-1}z + c_0 + \sum_{i=1}^{M} c_i z^{-i}.$$

47. A receiver system as in claim 46 wherein integer M of each receiver is also 1 whereby that receiver's transfer function $H_{EQ}(z)$ is given as:

$H_{EQ}(z) = c_{-1}z + c_0 + c_1 z^{-1}.$

48. A receiver system as in claim 45 further including adaptation control circuitry for adaptively adjusting at least one coefficient $c_i$ of each receiver in response to information provided, for that receiver, by operating on that receiver's equalized digital values or on further digital values generated, for that receiver, from that receiver's equalized digital values.

49. A receiver system as in claim 48 wherein the information provided, for each receiver, by operating on that receiver's equalized or further digital values comprises error information indicative, for that receiver, of how much that receiver's equalized or further digital values differ from decoded information generated, for that receiver, by decoding that receiver's equalized or further digital values.

50. A receiver system as in claim 49 wherein the decoded information used, for each receiver, in generating that receiver's error information is generated along a different signal processing path than that receiver's stream of symbols.

51. A receiver system as in claim 45 wherein the analog pre-filter of each receiver operates according to an adaptively variable transfer function in reducing intersymbol interference.

52. A receiver system as in claim 51 further including adaptation control circuitry for adaptively adjusting the transfer function of the analog pre-filter of each receiver in response to information provided, for that receiver, by operating on that receiver's equalized digital values or on further digital values generated, for that receiver, from that receiver's equalized digital values.

53. A receiver system as in claim 52 wherein the information provided, for each receiver, by operating on that receiver's equalized or further digital values comprises error information indicative, for that receiver, of how much that receiver's equalized or further digital values differ from decoded information generated, for that receiver by decoding that receiver's equalized or further digital values.

54. A receiver system as in claim 52 wherein the adaptation control circuitry also adaptively adjusts at least one coefficient $c_i$ of each receiver in response to the information provided, for each receiver, by operating on that receiver's equalized or further digital values.

55. A receiver system as in claim 45 wherein each receiver further includes an echo canceller for causing that receiver's equalized or/and intermediate digital values to be produced with reduced effects of echo in that receiver's input analog signal.

56. A receiver system as in claim 55 wherein the echo canceller of each receiver performs that receiver's echo reduction at least partially adaptively.

57. A receiver system as in claim 55 wherein the echo canceller of each receiver performs analog echo reduction on at least one of (a) that receiver's input analog signal, (b) a third intermediate analog signal generated from that receiver's input analog signal, (c) that receiver's filtered analog signal, and (d) a fourth intermediate analog signal generated from that receiver's filtered analog signal.

58. A receiver system as in claim 57 wherein the echo canceller of each receiver performs that receiver's analog echo reduction at least partially adaptively.

59. A receiver system as in claim 57 wherein the echo canceller of each receiver also performs digital echo reduction on at least one of (a) that receiver's initial digital signal, (b) a further intermediate digital signal generated from that receiver's initial digital signal, (c) that receiver's equalized digital values, and (d) further digital values generated from that receiver's equalized digital values.

60. A receiver system as in claim 59 wherein the echo canceller of each receiver performs that receiver's analog and digital echo reductions at least partially adaptively.

61. A receiver system as in claim 55 wherein the echo canceller of each receiver operates in response to error information indicative of how much that receiver's equalized digital values or further digital values generated from that receiver's equalized digital values differ from decoded information generated, for that receiver, by decoding that receiver's equalized or further digital values.

62. A receiver system as in claim 45 wherein each receiver further includes a crosstalk canceller for causing that receiver's equalized or/and intermediate digital values to be produced with reduced effects of crosstalk in that receiver's input analog signal.

63. A receiver system as in claim 62 wherein the crosstalk canceller of each receiver performs that receiver's crosstalk reduction at least partially adaptively.

64. A receiver system as in claim 45 further including a delay skew compensator which compensates for time skew in the equalized or/and intermediate digital values of each receiver relative to the equalized or/and intermediate digital values of each other receiver.

\* \* \* \* \*